United States Patent
Lee et al.

(10) Patent No.: US 11,304,156 B2
(45) Date of Patent: Apr. 12, 2022

(54) PHYSICAL LAYER ASPECTS FOR HIERARCHICAL MOBILITY

(71) Applicant: QUALCOMM Incorporated, San Diego, CA (US)

(72) Inventors: Heechoon Lee, San Diego, CA (US); Hung Dinh Ly, San Diego, CA (US); Tingfang Ji, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 68 days.

(21) Appl. No.: 16/717,997

(22) Filed: Dec. 17, 2019

(65) Prior Publication Data

US 2020/0221408 A1    Jul. 9, 2020

Related U.S. Application Data

(60) Provisional application No. 62/794,811, filed on Jan. 21, 2019, provisional application No. 62/788,576, filed on Jan. 4, 2019.

(51) Int. Cl.
*H04W 72/04* (2009.01)
*H04W 56/00* (2009.01)
(Continued)

(52) U.S. Cl.
CPC ..... *H04W 56/0005* (2013.01); *H04J 11/0073* (2013.01); *H04J 11/0076* (2013.01);
(Continued)

(58) Field of Classification Search
CPC . H04W 56/0005; H04W 76/28; H04W 76/27; H04W 52/285; H04W 52/0229;
(Continued)

(56) References Cited

U.S. PATENT DOCUMENTS 9,063,548 B1   6/2015  Ferguson et al.
9,081,385 B1   7/2015  Ferguson et al.
(Continued)

FOREIGN PATENT DOCUMENTS

WO   WO-2018172347 A1   9/2018

OTHER PUBLICATIONS

R2-1811177, MediaTek Inc.—UE Behaviour of WUS Monitoring, Aug. 20-24, 2018 (Year: 2018).*
(Continued)

*Primary Examiner* — Hassan Kizou
*Assistant Examiner* — Mahbubul Bar Chowdhury
(74) *Attorney, Agent, or Firm* — Norton Rose Fulbright US LLP

(57) ABSTRACT

In aspects, a base station and a user equipment (UE) exchange synchronization signal blocks (SSBs) carrying a SFN identity, and a waveform of the SSBs has a secondary synchronization signal (SSS) symbol preceding a primary SS symbol. In aspects, a base station transmits a radio access network area code (RAN-AC) SS and RAN-AC page are quasi co-located (QCL). In aspects, a base station transmits a RAN-AC SS over a SFN while avoiding overlap of RAN-AC SS resources with channels employed for initial access of update area cells. In aspects, a base station provides a control resource set (CORESET) to a UE upon release from a connected state, and the UE receives a RAN-AC paging PDCCH based on the CORESET. In aspects, a base station transmits a SFN wake up signal (WUS) when there is a grant for paging, and the UE monitors for the WUS.

28 Claims, 22 Drawing Sheets

(51) Int. Cl.
| | |
|---|---|
| *H04W 76/28* | (2018.01) |
| *H04W 76/27* | (2018.01) |
| *H04J 11/00* | (2006.01) |
| *H04W 52/28* | (2009.01) |
| *H04W 72/12* | (2009.01) |

(52) U.S. Cl.
CPC ..... *H04W 52/285* (2013.01); *H04W 72/1294* (2013.01); *H04W 76/27* (2018.02); *H04W 76/28* (2018.02); *H04J 2011/0096* (2013.01); *H04J 2211/005* (2013.01)

(58) Field of Classification Search
CPC ............... H04W 72/1294; H04W 68/02; H04J 11/0073; H04J 11/0076; H04J 2011/0096; H04J 2211/005; Y02D 30/70
See application file for complete search history.

(56) References Cited

U.S. PATENT DOCUMENTS

| | | | |
|---|---|---|---|
| 9,428,187 | B2 | 8/2016 | Lee |
| 10,121,367 | B2 | 11/2018 | Jammoussi et al. |
| 2007/0255480 | A1 | 11/2007 | Southall et al. |
| 2014/0358414 | A1 | 12/2014 | Ibrahim et al. |
| 2016/0176341 | A1 | 6/2016 | Raghu et al. |
| 2016/0366721 | A1* | 12/2016 | Song ............... H04L 12/189 |
| 2017/0267177 | A1 | 9/2017 | Nariyambut Murali et al. |
| 2018/0189577 | A1 | 7/2018 | Yoo et al. |
| 2018/0189578 | A1 | 7/2018 | Yang et al. |
| 2019/0103026 | A1 | 4/2019 | Liu et al. |
| 2019/0239189 | A1* | 8/2019 | Hwang ............. H04W 52/0229 |
| 2019/0254110 | A1* | 8/2019 | He ..................... H04L 5/0048 |
| 2019/0266418 | A1 | 8/2019 | Xu et al. |
| 2020/0092814 | A1* | 3/2020 | Zhou ................... H04W 80/02 |
| 2020/0107267 | A1* | 4/2020 | Wu .................... H04W 52/0229 |
| 2020/0218909 | A1 | 7/2020 | Myeong et al. |
| 2020/0260382 | A1* | 8/2020 | Ljung ................. H04L 5/0048 |
| 2020/0396687 | A1* | 12/2020 | Hwang ............. H04W 68/005 |
| 2021/0068010 | A1* | 3/2021 | Xu ..................... H04W 36/24 |
| 2021/0105719 | A1* | 4/2021 | Thangarasa ......... H04W 68/005 |

OTHER PUBLICATIONS

R2-1807097, RAN WG2#102, Report of email discussion to progress open issues on WUS, May 21-25, 2018 (Year: 2018).*

Chougule S., et al., "Reliable multilane detection and classi cation by utilizing CNN as a regression network", Munich, Germany, Sep. 8-14, 2018, Proceedings, Part V. 10.1007/978-3-030-11021-5_46, 14 pages.

"3rd Generation Partnership Project, Technical Specification Group Radio Access Network, Evolved Universal Terrestrial Radio Access (E-UTRA) and Evolved Universal Terrestrial Radio Access Network (E-UTRAN), Overall description, Stage 2, (Release 15)", 3GPP Draft, Draft 36300-F40, 3rd Generation Partnership Project (3GPP), Mobile Competence Centre, 650, Route Des Lucioles, F-06921, Sophia-Antipolis Cedex, France, Dec. 28, 2018 (Dec. 28, 2018), XP051576805, 362 pages, Retrieved from the Internet: URL: http://www.3gpp.org/ftp/tsg%5Fran/WG2%5FRL2/Specifications/201812%5Fdraft%5Fspecs%5Fafter%5FRAN%5F82/Draft%5F36300%2Df40%2Ezip. [retrieved on Dec. 28, 2018] paragraphs [04.4], [5.1.4], [5.1.4a] paragraphs [5. 1. 10], [5. 1. 11] paragraph [10.1.4]—paragraph [10.1.9.5].

"3rd Generation Partnership Project, Technical Specification Group Radio Access Network, Evolved Universal Terrestrial Radio Access (E-UTRA), Radio Resource Control (RRC), Protocol specification (Release 15)", 3GPP Draft, 36331-F30, 3rd Generation Partnership Project (3GPP), Mobile Competence Center, 650, Route Lucioles, F-06921, Sophia-Antipolis Cedex, France, Oct. 1, 2018 (Oct. 1, 2018), XP051519475, 918 pages, Retrieved from the Internet: URL: http://www.3gpp.org/ftp/tsg%5FranfWG2%5FRL2/Specifications/201809%5Ffinal%5Fspecs%5Fafter%5FRAN%5F81/36331%2Df30%2Ezip. [retrieved on Oct. 1, 2018] paragraphs [5.3.2.1], [5.3.2.3] paragraph [5.3.17]—paragraph [5.3.17.2] paragraphs [6.3.6], [6.7.3.2].

International Search Report and Written Opinion—PCT/US2019/067201—ISA/EPO—dated Mar. 26, 2020.

Mediatek Inc: "UE Group Wake-up Signal in NB-IOT", 3GPP Draft, R2-1816956 UE-Group WUS in NB-IOT, 3rd Generation Partnership Project (3GPP), Mobile Competence Center, 650, Route Lucioles, F-06921, Sophia-Antipolis Cedex, France, vol. RAN WG2, No. Spokane, WA, USA, Nov. 12, 2018-Nov. 16, 2018, Nov. 2, 2018 (Nov. 2, 2018), XP051480895, 5 pages, Retrieved from the Internet: URL: http://www.3gpp.org/ftp/tsg%5Fran/WG2%5FRL2/TSGR2%5F104/Docs/R2%2D1816956%2Ezip. [retrieved on Nov. 2, 2018] paragraph [002.].

Qualcomm Incorporated: "Views on UE Power Saving," 3GPP Draft, 3GPP TSG RAN WG1 Meeting #94, R1-1809462 Views on UE Power Saving, 3rd Generation Partnership Project (3GPP), Mobile Competence Centre, 650, Route Des Lucioles, F-06921 Sophia-Antipolis Cedex, France, vol. RAN WG1, No. Gothenburg, Sweden, Aug. 20, 2018-Aug. 24, 2018, Aug. 17, 2018, XP051516827, 12 Pages, Retrieved from the Internet: URL: http://www.3gpp.org/ftp/tsg%5Fran/WG1%5FRL1/TSGR1%5F94/Docs/R1%2D1809462%2Ezip [retrieved on Aug. 17, 2018].

* cited by examiner

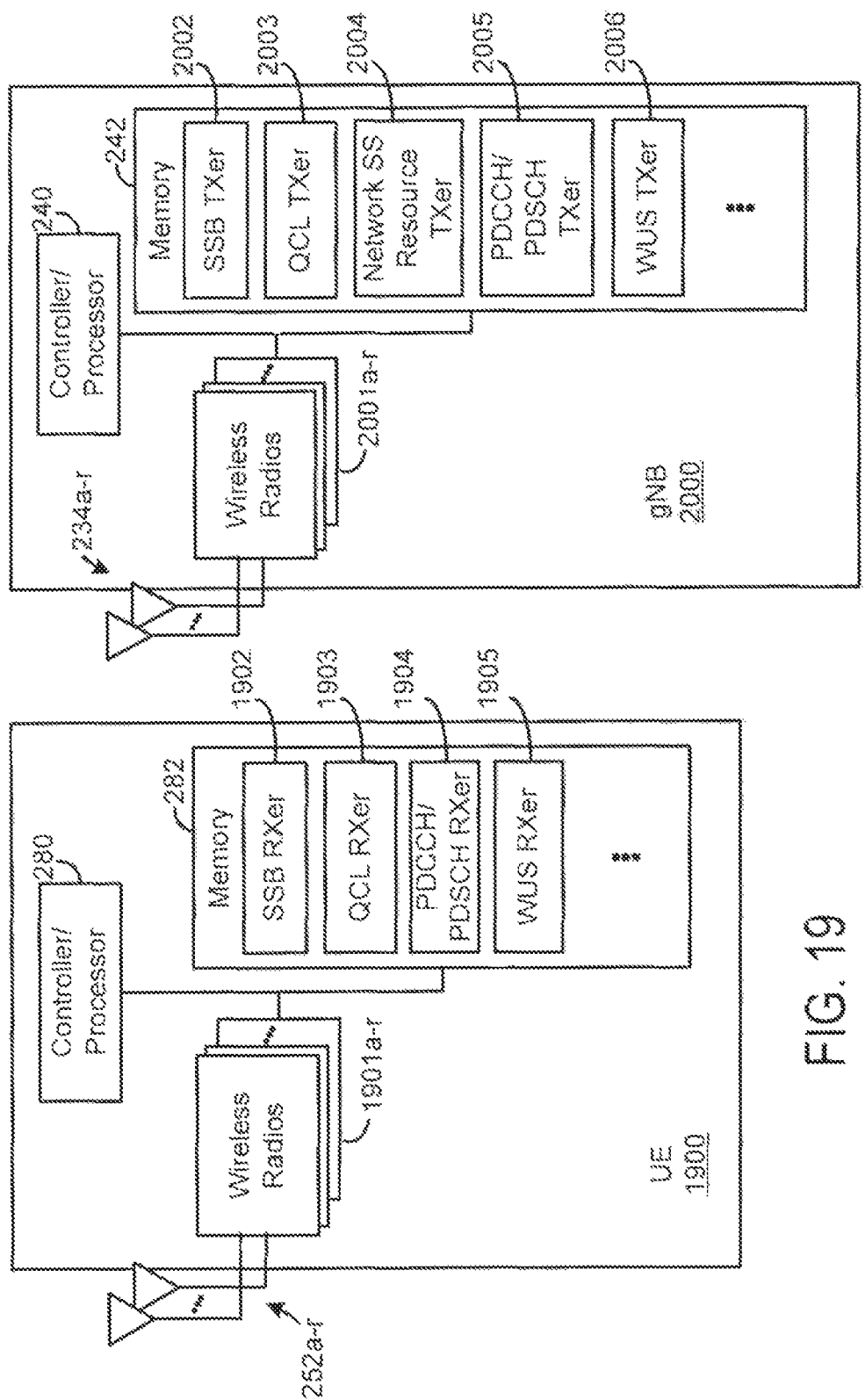

PHYSICAL LAYER ASPECTS FOR HIERARCHICAL MOBILITY

CROSS-REFERENCE TO RELATED APPLICATIONS

This application claims the benefit of U.S. Provisional Patent Application No. 62/788,576, entitled, "PHYSICAL LAYER ASPECTS FOR HIERARCHICAL MOBILITY," filed on Jan. 4, 2010, and the benefit of U.S. Provisional Patent Application No. 62/794,811, entitled, "PHYSICAL LAYER ASPECTS FOR HIERARCHICAL MOBILITY," filed on Jan. 21, 2019, the disclosures of which are expressly incorporated by reference herein in their entirety.

TECHNICAL FIELD

Aspects of the present disclosure relate generally to wireless communication systems, and more particularly, to physical layer aspects of hierarchical mobility.

INTRODUCTION

Wireless communication networks are widely deployed to provide various communication services such as voice, video, packet data, messaging, broadcast, and the like. These wireless networks may be multiple-access networks capable of supporting multiple users by sharing the available network resources. Such networks, which are usually multiple access networks, support communications for multiple users by sharing the available network resources.

A wireless communication network may include a number of base stations or node Bs that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink front the UE. On the downlink, a transmission front the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance wireless communication technologies not only to meet the growing demand for mobile broadband access, but to advance and enhance the user experience with mobile communications.

BRIEF SUMMARY OF SOME EMBODIMENTS

The following summarizes some aspects of the present disclosure to provide a basic understanding of the discussed technology. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

In one aspect of the disclosure, a method for wireless communication at a UE is provided. The method of embodiments includes operating in at least one of an idle state or a radio resource control (RRC) inactive state of a discontinuous reception (DRX) mode and identifying, based at least in part on the UE operating in the at least one of the idle state or the RRC inactive state, a network comprising a plurality of cells corresponding to a portion of cells of an update area zone. The method of embodiments further includes receiving a network synchronization signal (SS) broadcast by the plurality of cells over the network and monitoring for a network wake up signal (WUS) broadcast by the plurality of cells over the network.

In an additional aspect of the disclosure, an apparatus configured for wireless communication at a UE is provided. The apparatus of embodiments includes means for operating in at least one of an idle state or a RRC inactive state of a DRX mode and means for identifying, based at least in part on the UE operating in the at least one of the idle state or the RRC inactive state, a network comprising a plurality of cells corresponding to a portion of cells of an update area zone. The apparatus of embodiments further includes means for receiving a network SS broadcast by the plurality of cells over the network and monitoring for a network WUS broadcast by the plurality of cells over the network.

In an additional aspect of the disclosure, a non-transitory computer-readable medium having program code recorded thereon for wireless communication at a UE is provided. The program code of embodiments includes code to operate in at least one of an idle state or a RRC inactive state of a DRX mode and to identify, based at least in part on the UE operating in the at least one of the idle state or the RRC inactive state, a network comprising a plurality of cells corresponding to a portion of cells of an update area zone. The program code of embodiments further includes code to receive a network SS broadcast by the plurality of cells over the network and to monitor for a network WUS broadcast by the plurality of cells over the network.

In an additional aspect of the disclosure, an apparatus configured for wireless communication at a UE is provided. The apparatus includes at least one processor, and a memory coupled to the processor. The at least one processor of embodiments is configured to operate in at least one of an idle state or a RRC inactive stale of a DRX mode, and to identify, based at least in part on the UE operating in the at least one of the idle state or the RRC inactive state, a network comprising a plurality of cells corresponding to a portion of cells of an update area zone. The at least one processor of embodiments is further configured to receive a network SS broadcast by the plurality of cells over the network, and to monitor for a network WUS broadcast by the plurality of cells over the network.

In accordance with aspects of the disclosure, the foregoing systems, methods, and apparatuses may be implemented in combination with one or more additional features, such as the following features whether alone or in combination. For example, the above systems, methods, and apparatuses may include detecting the network WUS and receiving a page over the network and switching to cell-level mobility in response to detecting the network WUS. The above systems, methods, and apparatuses may include detecting the network WUS and, in response to detecting the network WUS, switching to cell-level mobility, identifying a serving cell, and receiving a cell-specific page by monitoring a paging search space for the identified serving cell. The above systems, methods, and apparatuses may include a minimum gap between the network WUS and the cell-specific page indicated by the network WUS. The above systems, methods, and apparatuses may include monitoring for the network WUS every DRX cycle in place of paging monitoring. The above systems, methods, and apparatuses may include receiving one or more synchronization signal blocks (SSBs) broadcast by the plurality or cells over the network, wherein the SSBs carry a network identity instead of a physical cell identity, and a waveform of the SSBs has one symbol carrying a primary synchronization signal (PSS) and two or more symbols carrying a secondary synchronization signal (SSS), at least one of the two or more symbols carrying the SSS preceding the symbol carrying the PSS, and performing a channel measurement procedure based at least in part on the one or more SSBs received over the network. The above systems, methods, and apparatuses may include an update area zone comprising a radio access network area code (RAN-AC), and the network identity being a RAN-AC identity. The above systems, methods, and apparatuses may include receiving a channel over the network, the channel including the network SS, and determining that channel characteristics of another channel over the network are the same as the received channel, wherein the other channel includes a network page. The above systems, methods, and apparatuses may include the channel and the another channel having a same subcarrier spacing. The above systems, methods, and apparatuses may include the network being a single frequency network (SFN).

In one aspect of the disclosure, a method for wireless communication at a base station is provided. The method of embodiments includes determining that the base station is a part of a network comprising a plurality of cells corresponding to a portion of cells of an update area zone configured for a UE. The method of embodiments further includes determining whether there is a grant for paging, transmitting a network SS to the UE over the network, and transmitting a network WUS over the network and a page in response to determining that there is a grant for paging.

In an additional aspect of the disclosure, apparatus configured for wireless communication at a base station is provided. The apparatus of embodiments includes means for determining that the base station is a part of a network comprising a plurality of cells corresponding to a portion of cells of an update area zone configured for a UE. The apparatus of embodiments further includes means for determining whether there is a grant for paging, means for transmitting a network SS to the UE over the network, and means for transmitting a network WUS over the network and a page in response to determining that there is a grant for paging.

In an additional aspect of the disclosure, a non-transitory computer-readable medium having program code recorded thereon for wireless communication at a base station is provided. The program code of embodiments includes code to determine that the base station is a part of a network comprising a plurality of cells corresponding to a portion of cells of an update area zone configured for a UE. The program code of embodiments further includes code to determine whether there is a grant for paging, to transmit a network SS to the UE over the network, and to transmit a network WUS over the network and a page in response to determining that there is a grant for paging.

In an additional aspect of the disclosure, an apparatus configured for wireless communication at a base station is provided. The apparatus includes at least one processor, and a memory coupled to the processor. The at least one processor is configured to determine that the base station is a part of a network comprising a plurality of cells corresponding to a portion of cells of an update area zone configured for a UE. The at least one processor of embodiments is further configured to determine whether there is a grant for paging, to transmit a network SS to the UE over the network, and to transmit a network WUS over the network and a page in response to determining that there is a grant for paging.

In accordance with aspects of the disclosure, the foregoing systems, methods, and apparatuses may be implemented in combination with one or more additional features, such as the following features whether alone or in combination. For example, the above systems, methods, and apparatuses may include the page being a network page and is transmitted over the network. The above systems, methods, and apparatuses may include the page being a cell-specific page, and implementing a minimum gap between the network WUS and the page sufficient to allow the UE enough time to switch to cell-level mobility, identify a serving cell, and begin monitoring a paging search space for the identified serving cell. The above systems, methods, and apparatuses may include the minimum gap being indicated as a part of the network WUS. The above systems, methods, and apparatuses may include transmitting one or more cell-specific SSBs to the UE, wherein the network SS transmitted to the UE over the network includes one or more SSBs that carry a network identity instead of a physical cell identity, and a waveform of the SSBs of the network SS transmitted over the network has one symbol carrying a PSS and two or more symbols carrying a SSS, at least one of the two or more symbols carrying the SSS preceding the symbol carrying the PSS. The above systems, methods, and apparatuses may include the update area zone comprising a RAN-AC, and the network identity being a RAN-AC identity. The above systems, methods, and apparatuses may include the waveform of the SSBs of the network SS has a SSS followed immediately by a PSS and the PSS is followed immediately by one or more repetition of the SSS. The above systems, methods, and apparatuses may include transmitting a channel over the network, the channel including the network SS, and transmitting another channel over the network, the other channel including a network page, wherein the channel and the another channel have same channel characteristics. The above systems, methods, and apparatuses may include the channel and the another channel having a same subcarrier spacing. The above systems, methods, and apparatuses may include the network being a SFN.

Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

FIG. 19 is a block diagram illustrating a UE configured according to some embodiments of the present disclosure.

FIG. 20 is a block diagram illustrating a base station configured according to some embodiments of the present disclosure.

DETAILED DESCRIPTION

Figure 1:
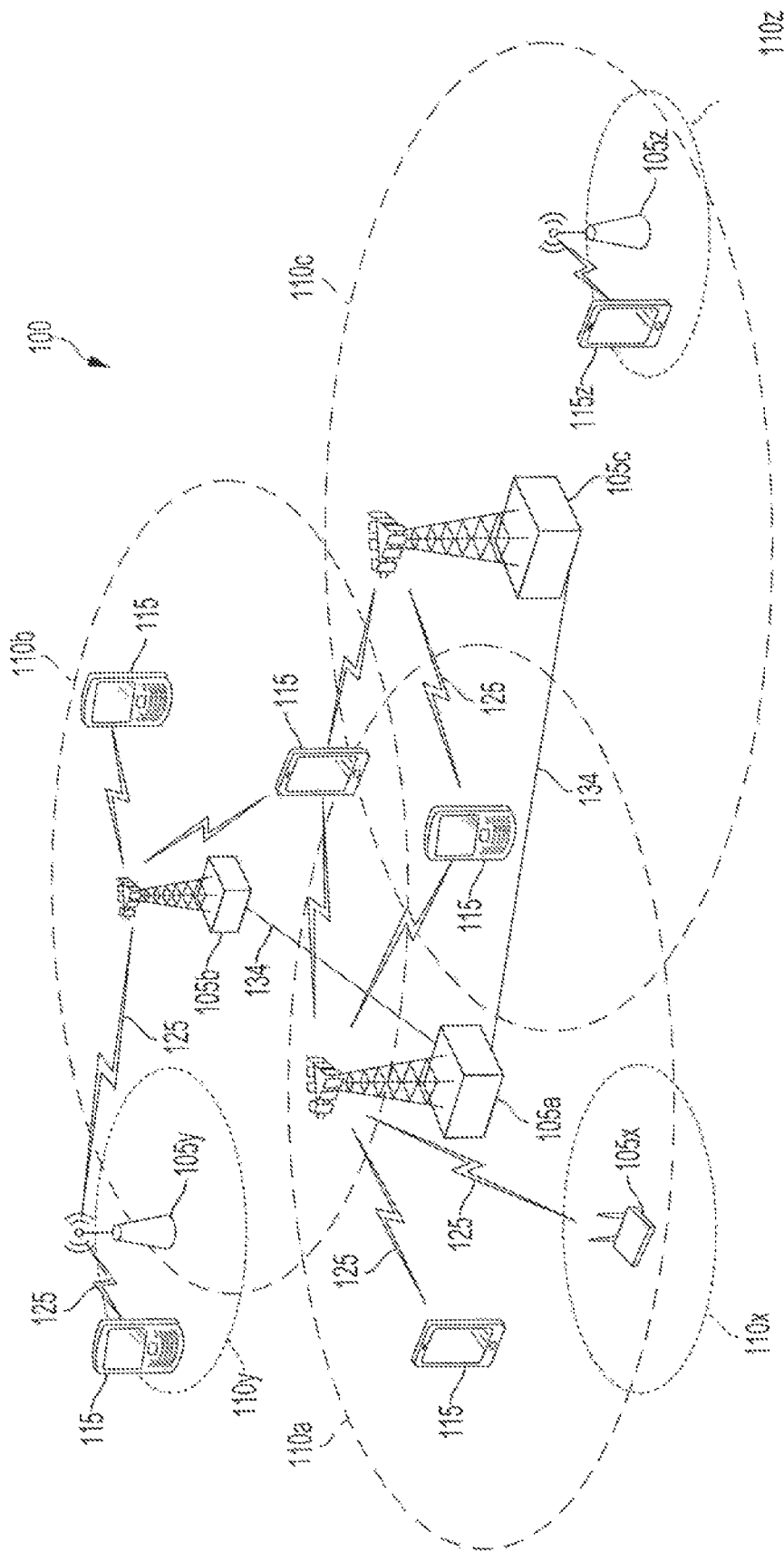
FIG. 1 is a block diagram illustrating details of a wireless communication system according to some embodiments of the present disclosure.

The detailed description set forth below, in connection with the appended drawings, is intended as a description of various possible configurations and is not intended to limit the scope of live disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

This disclosure relates generally to providing or participating in communication as between two or more wireless devices in one or more wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, long term evolution (LTE) networks, Global System for Mobile Communications (GSM) networks, as well as other communications networks. As described herein, the terms "networks" and "systems" may be used interchangeably according to the particular context.

A CDMA network, for example, may implement a radio technology such as universal terrestrial radio access (UTRA), cdma2000, and the like. UTRA includes wideband-CDMA (W-CDMA) and low chip rate (LCR). CDMA2000 covers IS-2000, IS-95, and IS-856 standards.

A TDMA network may, for example implement a radio technology such as GSM. 3GPP defines standards for the GSM EDGE (enhanced data rates for GSM evolution) radio access network (RAN), also denoted as GERAN. GERAN is the radio component of GSM/EDGE, together with the network that joins the base stations (for example the Ater and Abis interfaces) and the base station controllers (A interfaces, etc.). The radio access network represents a component of a GSM network, through which phone calls and packet data are routed from and to the public switched telephone network (PSTN) and Internet to and from subscriber handsets, also known as user terminals or user equipments (UEs). A mobile phone operator's network may comprise one or more GERANs, which may be coupled with Universal Terrestrial Radio Access Networks (UTRANs) in the case of a UMTS/GSM network. An operator network may also include one or more LTE networks, and/or one or more other networks. The various differed network types may use different radio access technologies (RATs) and radio access networks (RANs).

An OFDM A network may, for example, implement a radio technology such as evolved UTRA (E-UTRA), IEEE 802.11, IEEE 802.16, IEEE 802.20, flash-OFDM and the like. UTRA, E-UTRA, and GSM are part of universal mobile telecommunication system (UMTS). In particular, LTE is a release of UMTS that uses E-UTRA, UTRA, E-UTRA, GSM, UMTS and LTE, are described in documents provided from an organization named "3$^{rd}$ Generation Partnership Project" (3GPP), and cdma2000 is described in documents from an organization named "3$^{rd}$ Generation Partnership Project 2" (3GPP2). These various radio technologies and standards are known or are being developed. For example, the 3$^{rd}$ Generation Partnership Project (3GPP) is a collaboration between groups of telecommunications associations that aims to define a globally applicable third generation (3G) mobile phone specification. 3GPP long term evolution (LTE) is a 3GPP project aimed at improving the universal mobile telecommunications system (UMTS) mobile phone standard. The 3GPP may define specifications for the next generation of mobile networks, mobile systems, and mobile devices.

For clarity, certain aspects of the apparatus and techniques may be described below with reference to exemplary LTE implementations or in an LTE-centric way, and LTE terminology may be used as illustrative examples in portions of the description below; however, the description is not intended to be limited to LTE applications. Indeed, the present disclosure is concerned with shared access to wireless spectrum between networks using different radio access technologies or radio air interfaces.

Moreover, it should be understood that, in operation, wireless communication networks adapted according to the concepts herein may operate with any combination of licensed or unlicensed spectrum depending on loading and availability. Accordingly, it will be apparent to one of skill in the art that the systems, apparatus and methods described herein may be applied to other communications systems and applications than the particular examples provided.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and/or other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range from chip-level or modular components to non-modular, non-chip-level implementations and further to aggregated, distributed, or OEM devices or systems incorporating one or more described aspects. In some practical settings, devices incorporating described aspects and features may also necessarily include additional components and features for implementation and practice of claimed and described embodiments. It is intended that innovations described herein may be practiced in a wide variety of implementations, including both large/small devices, chip-level components, multi-component systems (e.g. RF-chain, communication interface, processor), distributed arrangements, end-user devices, etc. of varying sizes, shapes, and constitution.

FIG. 1 shows wireless network 100 for communication according to some embodiments. While discussion of the technology of this disclosure is provided relative to an LTE-A network (shown in FIG. 1), this is for illustrative purposes. Principles of the technology disclosed can be used in other network deployments, including fifth generation (5G) networks. As appreciated by those skilled in the art, components appearing in FIG. 1 are likely to have related counterparts in other network arrangements including, for example, cellular-style network arrangements and non-cellular-style-network arrangements (e.g., device to device or peer to peer or ad hoc network arrangements, etc.).

Turning back to FIG. 1 wireless network 100 includes a number of base stations, such as may comprise evolved node Bs (eNBs) or G node Bs (gNBs). These may be referred to as gNBs 105. A gNB may be a station that communicates with the UEs and may also be referred to as a base station, a node B, an access point, and the like. Each gNB 105 may provide communication coverage for a particular geographic area. In 3GPP, the term "cell" can refer to this particular geographic coverage area of a gNB and/or a gNB subsystem serving the coverage area, depending on the context in which the term is used. In implementations of wireless network 100 herein, gNBs 105 may be associated with a same operator or different operators (e.g., wireless network 100 may comprise a plurality of operator wireless networks), and may provide wireless communications using one or more of the same frequencies (e.g., one or more frequency hand in licensed spectrum, unlicensed spectrum, or a combination thereof) as a neighboring cell.

A gNB may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG). UEs for users in the home, and the like). A gNB for a macro cell may be referred to as a macro gNB. A gNB for a small cell may be referred to as a small cell gNB, a pico gNB, a femto gNB or a home gNB. In the example shown in FIG. 1, gNBs 105a, 105b and 105c are macro gNBs for the macro cells 110a, 110b end 110c, respectively. gNBs 105x, 105y, and 105z are small cell gNBs, which may include pico or femto gNBs that provide service to small cells 110x, 110y, and 110z, respectively. A gNB may support one or multiple (e.g., two, three, four, and the like) cells.

Wireless network 100 may support synchronous or asynchronous operation. For synchronous operation, the gNBs may have similar frame timing, and transmissions from different gNBs may be approximately aligned in time. For asynchronous operation, the gNBs may have different frame liming, and transmissions from different gNBs may not be aligned in time. In some scenarios, networks may be enabled or configured to handle dynamic switching between synchronous or asynchronous operations.

UEs 115 are dispersed throughout wireless network 100, and each UE may be stationary or mobile. It should be appreciated that, although a mobile apparatus is commonly referred to as user equipment (UE) in standards and specifications promulgated by the $3^{rd}$ Generation Partnership Project (3GPP), such apparatus may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, remote terminal, a handset, a terminal, a user agent, a mobile client, a client, or some other suitable terminology. Within the present document, a "mobile" apparatus or UE need not necessarily have a capability to move, and may be stationary. Some non-limiting examples of a mobile apparatus, such as may comprise embodiments of one or more of UEs 115, include a mobile, a cellular (cell) phone, a smart phone, a session initiation protocol (SIP) phone, a laptop, a personal computer (PC), a notebook, a netbook, a smart book, a tablet, and a personal digital assistant (PDA). A mobile apparatus may additionally be an "Internet of things" (IoT) device such as an automotive or other transportation vehicle, a satellite radio, a global positioning system (GPS) device, a logistics controller, a drone, a multi-copter, a quad-copter, a smart energy or security device, a solar panel or solar array, municipal lighting, water, or other infrastructure; industrial automation and enterprise devices; consumer and wearable devices, such as eyewear, a wearable camera, a smart watch, a health or fitness tracker, a mammal implantable device, gesture tracking device, medical device, a digital audio player (e.g., MP3 player), a camera, a game console, etc.; and digital home or smart home devices such as a home audio, video, and multimedia device, an appliance, a sensor, a vending machine, intelligent lighting, a home security system, a smart meter, etc. A mobile apparatus, such as UEs 115, may be able to communicate with macro gNBs, pico gNBs, femto gNBs, relays, and the like. In FIG. 1, a lightning bolt (e.g., communication links 125) indicates wireless transmissions between a UE and a serving gNB, which is a gNB designated to serve the UE on the downlink and/or uplink, or desired transmission between gNBs. Although backhaul communication 134 is illustrated as wired backhaul communications that may occur between gNBs, it should be appreciated that backhaul communications may additionally or alternatively be provided by wireless communications.

Figure 2:
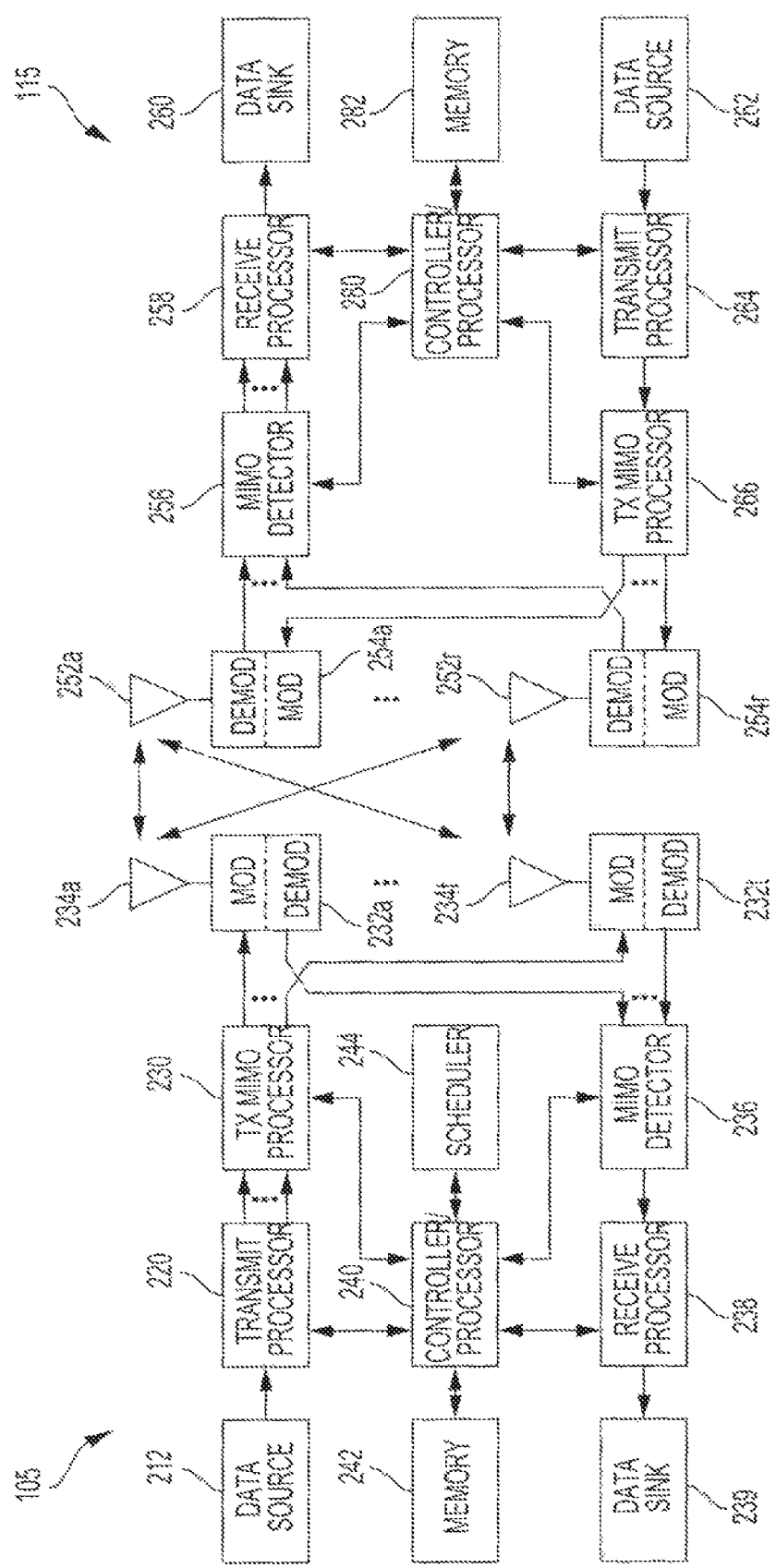
FIG. 2 is a block diagram conceptually illustrating a design of a base station/gNB and a UE configured according to some embodiments of the present disclosure.

FIG. 2 shows a block diagram of a design of base station/gNB 105 and UE 115. These can be one of the base stations/gNBs and one of the UEs in FIG. 1. For a restricted association scenario (as mentioned above), the gNB 105 may be small cell gNB 105z in FIG. 1, and UE 115 may be UE 115z which in order to access small cell gNB 105z, would be included in a list of accessible UEs for small cell gNB 105z. gNB 105 may also be a base station of some other type. gNB 105 may be equipped with antennas 234a through 234t, and UE 115 may be equipped with antennas 252a through 252r.

At gNB 105, transmit processor 220 may receive data from data source 212 and control information from controller/processor 240. The control information may be for the physical broadcast channel (PBCH), physical control formal indicator channel (PCFICH), physical hybrid-ARQ indicator channel) PHICH, physical downlink control channel (PDCCH), etc. The data may be for the physical downlink shared channel (PDSCH), etc. Transmit processor 220 may process (e.g., encode and symbol map) the data and control information to obtain data symbols and control symbols, respectively. Transmit processor 220 may also generate reference symbols, e.g., for the primary synchronization signal (PSS), secondary synchronization signal (SSS), and cell-specific reference signal (CRS). Transmit (TX) multiple-input multiple-output (MIMO) processor 230 may perform spatial processing (e.g., precoding) on the data symbols, the control symbols, and/or reference symbols, if applicable, and may provide output symbol streams to modulators (MODs) 232a through 232t. Each modulator 232 may process a respective output symbol stream (e.g., for OFDM, etc.) to obtain an output sample stream. Each modulator 232 may additionally or alternatively process (e.g., convert to analog, amplify, filter, and upconvert) the output sample stream to obtain a downlink signal. Downlink signals from modulators 232a through 232l may be transmitted via antennas 234a through 234l, respectively.

At UE 115, antennas 252a through 252r may receive the downlink signals from gNB 105 and may provide received signals to demodulators (DEMODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. MIMO detector 25b may obtain received symbols from all demodulators 254a through 254r, perform MIMO detection on the received symbols if applicable, and provide detected symbols. Receive processor 258 may process (e.g., demodulate, deinterleave, and decode) the detected symbols, provide decoded data for UE 115 to data sink 260, and provide decoded control information to controller/processor 280.

On live uplink, at UE 115, transmit processor 264 may receive and process data (e.g., for the PUSCH) from data source 262 and control information (e.g., for the PUCCH) from controller/processor 280. Transmit processor 264 may also generate reference symbols for a reference signal. The symbols from transmit processor 264 may be precoded by TX MIMO processor 266 it applicable, further processed by modulators 254a through 254r (e.g., for SC-FDM, etc.), and transmitted to gNB 105. At gNB 105, the uplink signals from UE 115 may be received by antennas 234, processed by demodulators 232, detected by MIMO detector 236 if applicable, and further processed by receive processor 238 to obtain decoded data and control information sent by UE 115. Processor 238 may provide the decoded data to data sink 239 and the decoded control information to controller/processor 240.

Controllers/processors 240 and 280 may direct tire operation at gNB 105 and UE 115, respectively. Controller/processor 240 and/or other processors and modules at gNB 105 and/or controllers/processor 280 and/or other processors and modules at UE 115 may perform or direct the execution of various processes for the techniques described herein, such as to perform or direct the execution illustrated in FIGS. 3, 10-14, 15A, 15B, 16A, 16B, 17A, 17B, and 18, and/or other processes for the techniques described herein. Memories 242 and 282 may store data and program codes for gNB 105 and UE 115, respectively. Scheduler 244 may schedule UEs for data transmission on the downlink and/or uplink.

Figure 3:
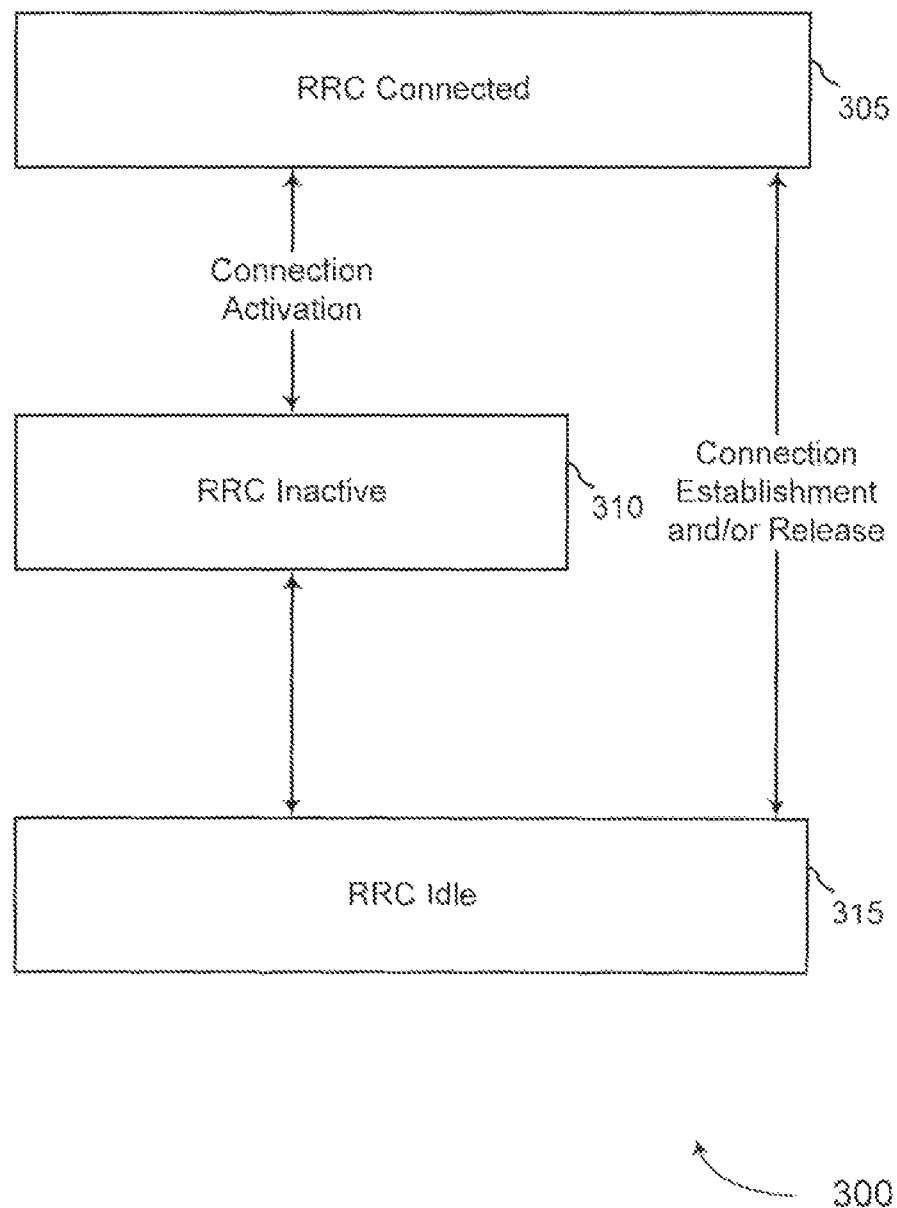
FIG. 3 is a block diagram illustrating a UE state machine according to some embodiments of the present disclosure.

Turning to FIG. 3, New Radio (NR) introduces an additional operational state to the UE state machine 300, and thus additional stale transitions, but the UE still operates in only one state at a time. A RRC connected state 305 (NR RRC_CONNECTED) corresponds to the LTE CONNECTED state for active data transfer, and a RRC idle state 315 (NR RRC_IDLE) corresponds to the LTE IDLE state for initial access. A RRC inactive state 310 (NR RRC_INACTIVE) is a new radio resource control (RRC) state that is similar to the idle state 315, but that maintains access stratum (AS) context information by implementing UE specific discontinuous reception (DRX). The UE specific DRX may be configured by upper layers or by RRC layer, and the UE performs radio access network (RAN) based notification area updates when moving outside the RAN-based notification area.

Generally, a UE may be configured with a state machine 300 and perform one or more state transitions. In some aspects, the UE may only operate in one RRC state at any given instance. For example, the UE may be operating in a RRC connected state 305 (which may also be referred to as an RRC active state), RRC inactive state 310, or in RRC idle state 315. In some aspects, the RRC connected state 305 may include the UE having an active connection to at least one cell or base station to perform active data communications. In some aspects, the RRC inactive state 310 may include the UE operating in an idle mode, but maintaining context information for the AS. For example, a UE-specific DRX mode may be configured for the UE by upper layers, RRC layer, etc., where the UE may perform notification zone-based updates when moving outside the notification zone area. In some aspects, the RRC idle state 315 may include the UE powering down certain components, functions, processes, and the like, to conserve power. In some aspects, the RRC idle state 315 may include the UE performing an initial access procedure to search for a serving cell to camp on.

As presented herein, a network (e.g., a single frequency network (SFN)) comprising a plurality of cells (e.g., a plurality of cells corresponding to a portion of cells of an update area zone, such as a group of cells in a radio access network area code (RAN-AC)) may be configured for the UE when the UE is operating in the RRC connected state 305 and/or in the RRC inactive state 310. The base stations forming the network portion (e.g., SFN area) may broadcast one or more network synchronization signal blocks (SSBs) to the UE, as well as cell-specific SSBs, which the UE may use to perform a channel measurement procedure. Based on the results of the channel measurement procedure (e.g., based on the received SSBs), the UE may perform timing and/or frequency based tracking and updates.

Reference is made below to SFN configurations and associated use of SFN synchronization signal (SS), SFN identity, SFN page, SFN PDCCH/PDSCH, etc. to provide examples for aiding in understanding concepts of the present disclosure. It should be appreciated, however, that the concepts herein are not limited to applicability with respect to single frequency network configurations, and thus various network configurations may implement some or all of the aspects of the present disclosure.

Figure 4:
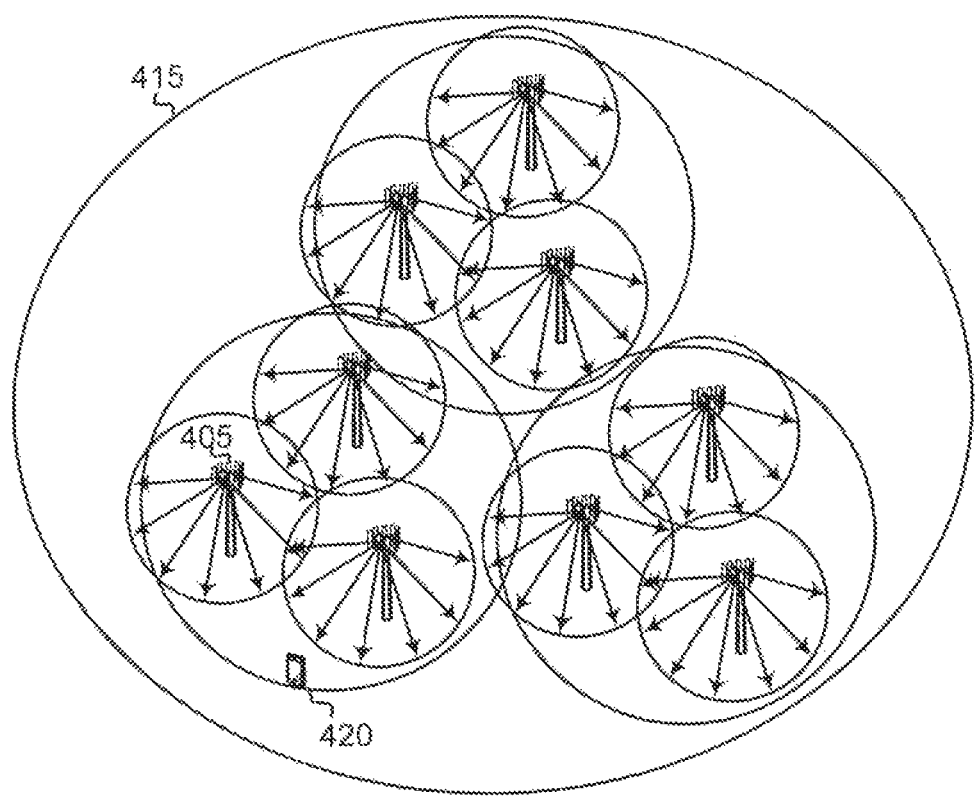
FIG. 4 is a block diagram illustrating a update area and a SFN according to some embodiments of the present disclosure.
Figure 4:
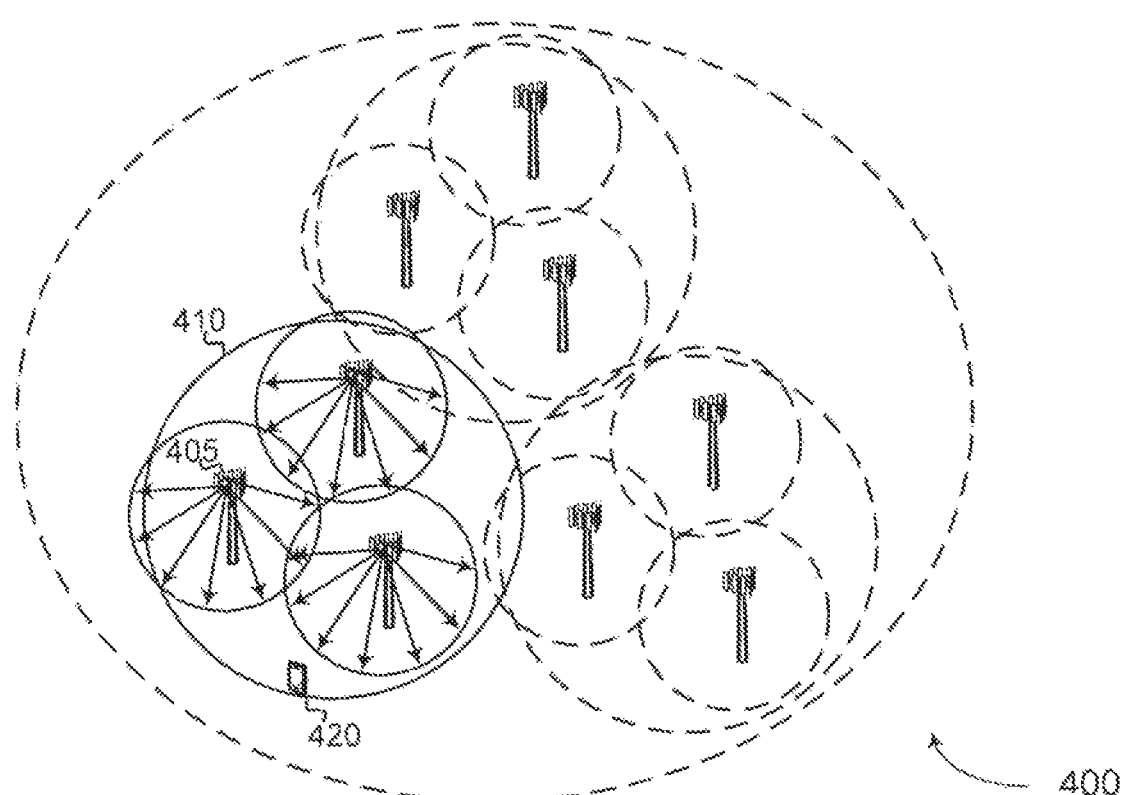

Turning to FIG. 4, the update area and SFN areas may also be used for paging. In the RRC idle state, multi-beam paging occurs over a tracking area 415, whereas in the RRC inactive state, paging occurs over a radio access network (RAN) notification area (RNA) that serves as a SFN area 410 within the tracking area 415. The network may beam sweep for paging, while the UE may monitor paging corresponding to the strongest synchronization signal (SS). The UE may update the network when it moves from one tracking area to another and when it moves from one RNA to another.

FIG. 4 illustrates an example of a wireless communication system 400 that supports multi-cell SFN areas in accordance with aspects of the present disclosure. Wireless communication system 400 may include a plurality of base stations 405 and a UE 420, which may be examples of the corresponding devices described herein. Aspects of wireless communication system 400 may be a SFN configured for SFN area 410. In some aspects, the functionalities described with respect to the base stations 405 may refer to functionalities performed by a network entity, such as one or more functions of a core network.

In some aspects, UE 420 may be operating in an RRC inactive or idle state of a DRX mode. Based at least in part on UE 420 operating in the RRC inactive or idle state of the DRX mode, a tracking area 415 may be configured for the UE 420. For example, the tracking area 415 may include a plurality of base stations 405 (with nine base stations 405 being shown by way of example only) configured to transmit signals, e.g., paging signals, to UE 420 in a beam sweeping manner, e.g., using a plurality of beamformed transmissions. When a paging event occurs for UE 420, the network entity may signal each base station 405 within the tracking area 415 to transmit a paging indicator/message in the beam sweeping manner to ensure coverage within each base station's 405 respective coverage area. While the tracking area 415 may provide a wide coverage area in which UE 420 can be paged, the tracking area 415 being used to page UE 420 also consumes a considerable amount or resources and/or reduces efficiency.

Additionally or alternatively, the UE 420 may be operating in an RRC active or inactive state of the DRX mode. Based at least in part on UE 420 operating in the RRC active or inactive state of the DRX mode, a network entity may configure a SFN for UE 420. In some aspects, an SFN may refer to a broadcast network where several transmitters (e.g., a plurality of cells, such as base stations 405) simultaneously send the same signal over the same frequency channel to UE 420. For example, a plurality of the base stations 405 (with three base stations 405 being shown by way of example only) may form the SFN for a SFN area 410 that is configured for UE 420. In some aspects, the size of the SFN area 410 and/or number of base stations 405 included in the SFN area 410 may vary. Accordingly, the SFN area 410 can have more or fewer base stations 405.

In some aspects, this may include the base stations 405 forming the SFN area 410 broadcasting one or more SSBs over the SFN of the SFN area 410. In some aspects, the one or more SSBs broadcast over the SFN may include a secondary synchronization signal (SSS), a primary synchronization signal (PSS), and/or a physical broadcast channel (PBCH) signal transmitted by the base stations 405 over the SFN for the SFN area 410. In some aspects, the periodicity, timing, and/or frequency for the one or more SSBs broadcast over the SFN by the base stations 405 may be the same or different with respect to cell specific SSBs transmitted by individual base stations 405 of the SFN area 410.

Accordingly, the base stations 405 of the SFN area 410 may transmit cell-specific SSBs as well as the one or more SSBs broadcast over the SFN for the SFN area 410. The one or more SSBs broadcast over the SFN for the SFN area 410 may use some, all, or none of the resources used for the cell-specific SSBs.

In some aspects, the UE 420 may monitor the SFN for the SFN area 410 while operating in the RRC inactive or active state of the DRX mode. Accordingly, UE 420 may receive one or more SSBs broadcast by the plurality of cells (e.g., base stations 405 located within the SFN area 410) over the SFN and perform a channel measurement procedure based at least in part on the received SSBs. Generally, the channel measurement procedure may provide an indication of a channel performance metric for a channel between UE 420 and at least one of the base stations 405. In some aspects, the channel measurement procedure may support liming synchronization/tracking, mobility tracking, frequency tracking, and the like. In some aspects, UE 420 may transmit a feedback message to one or more of the cells that carries or otherwise convey an indication of the channel performance metric.

Figure 5:
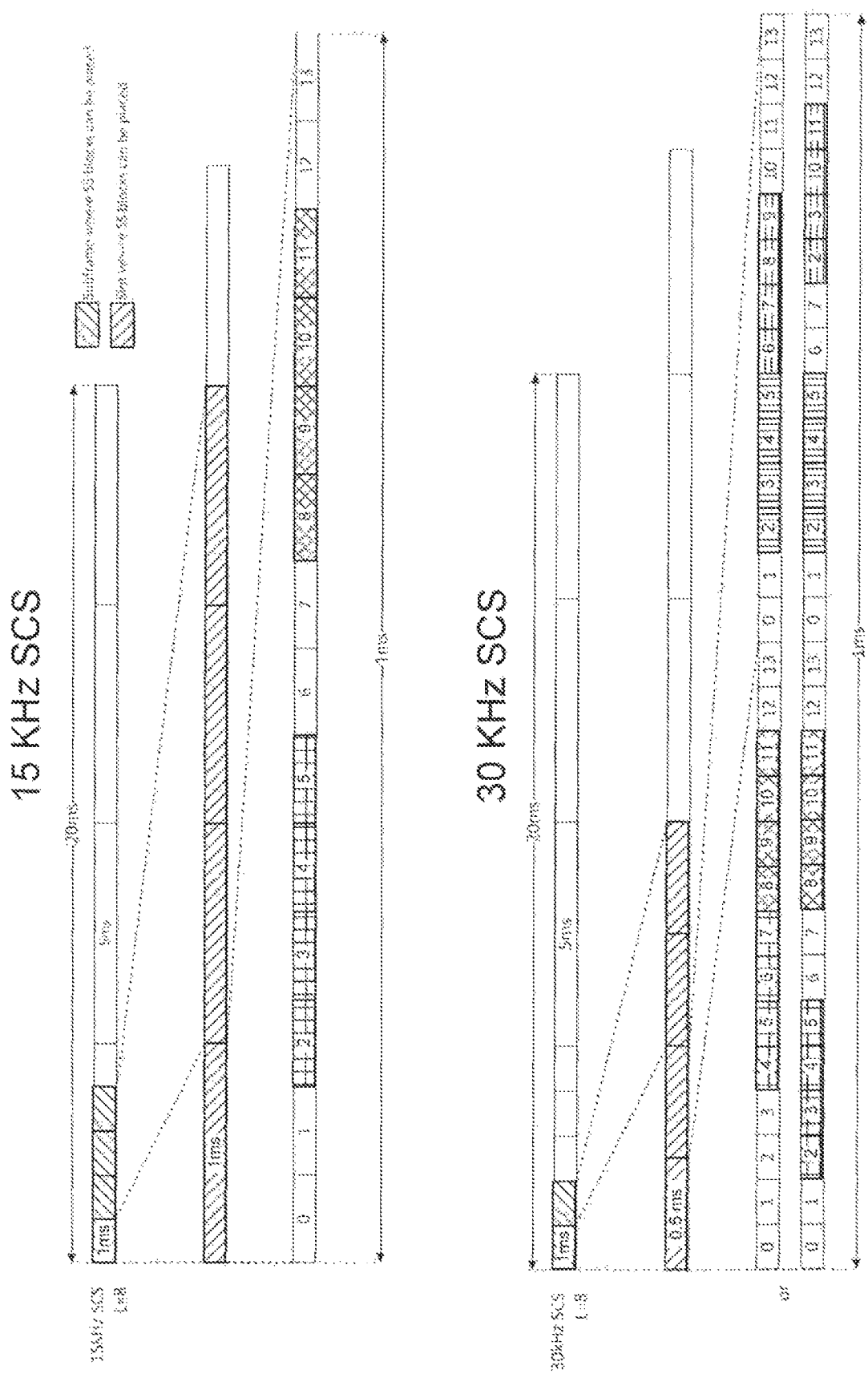
FIG. 5 is a block diagram illustrating subcarrier spacing of NR resources for transmission of SSBs according to some embodiments of the present disclosure.

Referring to FIG. 5, a multi-beam SSB may be transmitted using 15 KHz subcarrier spacing or 30 KHz subcarrier spacing and the UE in the RRC idle or RRC inactive state may monitor the SSB accordingly. NR allows up to four beams for carrier frequencies less than three GHz. and up to eight beams for carrier frequencies of three to six GHz. Accordingly, when the UE needs to monitor a particular cell, it needs to track the strangest SSB and monitor paging from that SSB, which includes PSS, SSS, and PBCH. As shown, for a SSB set in twenty milliseconds, only 4 SSBs can be used for carrier frequencies less than three GHz, and up to eight SBs can be used for carrier frequencies of three to six GHz. Accordingly, for carrier frequencies less than three GHz, a 15 KHz subcarrier spacing yields a 2 ms SSB, whereas a 30 KHz subcarrier spacing yields a 1 ms SSB. In contrast, for carrier frequencies of three to six GHz, a 30 KHz subcarrier spacing yields a 4 ms SSB, whereas a 30 KHz subcarrier spacing yields a 2 ms SSB.

The introduction of multi-beam SSB monitoring presents issues that need to be addressed. For example, additional radio frequency on time and additional processing are required compared to single beam monitoring. Also, paging inefficiency results from multi-beam paging. These issues are addressed by implementing enhancements to multi-beam monitoring at the UE, and to multi-beam paging at the gNB. Such enhancements include hierarchical down link-based mobility using zones as described herein.

Figure 6:
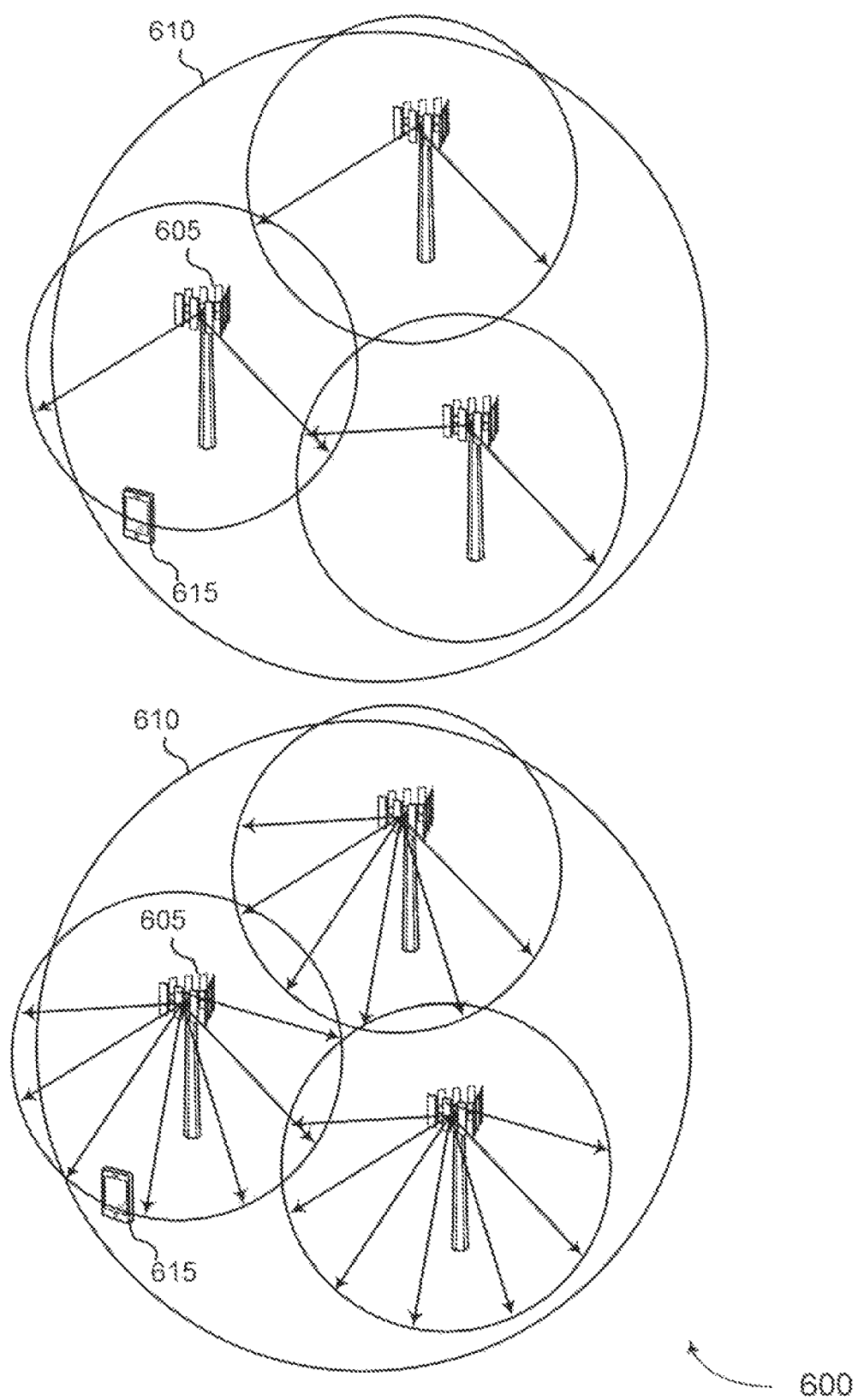
FIG. 6 is a block diagram illustrating paging over groups of cells according to some embodiments of the present disclosure.

Turning to FIG. 6, the hierarchical downlink-based mobility is implemented by introducing a SFN, SS, and SFN paging over a group of cells in a radio access network area code (RAN-AC). The UP monitors SFN SS and SFN paging in RRC_IDLE, and RRC_INACTIVE states. This hierarchical mobility is mainly targeted for carrier frequencies less than six GHz, as camping is expected on such lower carrier frequencies rather than mmW carrier frequencies due to coverage.

FIG. 6 illustrates an example of a wireless communication system 600 that supports multi-cell SFN areas in accordance with aspects of the present disclosure. Wireless communication system 600 may include a plurality of base stations 605 and a UE 615, which may be examples of the corresponding devices described herein. In some aspects, wireless communication system 600 may be a SFN configured for SFN area 610 that supports hierarchical mobility and paging functions for UE 615. In some aspects, the functionalities described with respect to the base stations 605 may refer to functionalities performed by a network entity, such as one or more functions of a core network.

In some aspects, UE 615 may be operating in an RRC active or inactive state of a DRX mode. Based at least in pan on UE 615 operating in the RRC active or inactive state of the DRX mode, a network entity may configure a SFN for UE 615. In some aspects, an SFN may refer to a broadcast network where several transmitters (e.g., a plurality of cells, such as base stations 605) simultaneously send the same signal over the same frequency channel to UE 615. For example, each of the base stations 605, e.g., cells, may form the SFN for the SFN area 610 that is configured for UE 615.

In some aspects, this may include the base stations 605 forming the SFN area 610 broadcasting one or more SSBs over the SFN of the SFN area 610 (shown in the top of FIG. 6). In some aspects, the one or more SSBs broadcast over the SFN may include a SSS, a PSS, and/or a PBCH signal transmitted by the base stations 605 over the SFN for the SFN area 610. In some aspects, the one or more SSBs broadcast over the SFN for the SFN area 610 may be transmitted using an omni-directional transmission.

In some aspects, this may include the base stations 605 forming the SFN area 610 broadcasting, respectively, cell-specific SSBs within their respective coverage areas (shown in the bottom of FIG. 6). In some aspects, the one or more cell-specific SSBs broadcast by the base stations 605 forming the SFN area 610 may be transmitted in a beam sweeping manner using a plurality of transmit beams.

In some aspects, the periodicity, timing, and/or frequency for the one or more SSBs broadcast over the SFN by the base stations 605 may be the same or different with respect to the cell specific SSBs transmitted by individual base stations 605 within the SFN area 610. Accordingly, the base stations 605 of the SFN area 610 may transmit cell-specific SSBs as well as the one or more SSBs broadcast over the SFN for the SFN area 610. The one or more SSBs broadcast over the SFN for the SFN area 610 may use some, all, or none, of the resources used for the cell-specific SSBs.

In some aspects, the UE 615 may monitor the SFN for the SFN area 610 while operating in the RRC inactive or active state of the DRX mode. Accordingly, UE 615 may receive one or more SSBs broadcast by the plurality of cells (e.g., base stations 405 located within the SFN area 610) over the SFN and/or cell-specific SSBs transmitted by respective base stations 605 within the SFN area 610 and perform a channel measurement procedure based at least in part on the received SSBs. Generally, the channel measurement procedure may provide an indication of a channel performance metric for a channel between UE 615 and at least one of the base stations 605. In some aspects, the channel measurement procedure may support timing synchronization/tracking, mobility tracking, frequency tracking, and the like. In some aspects, UE 615 may transmit a feedback message to one or more of the cells (e.g. one or more of the base stations 605) that carries or otherwise convey an indication of the channel performance metric.

Figure 7:
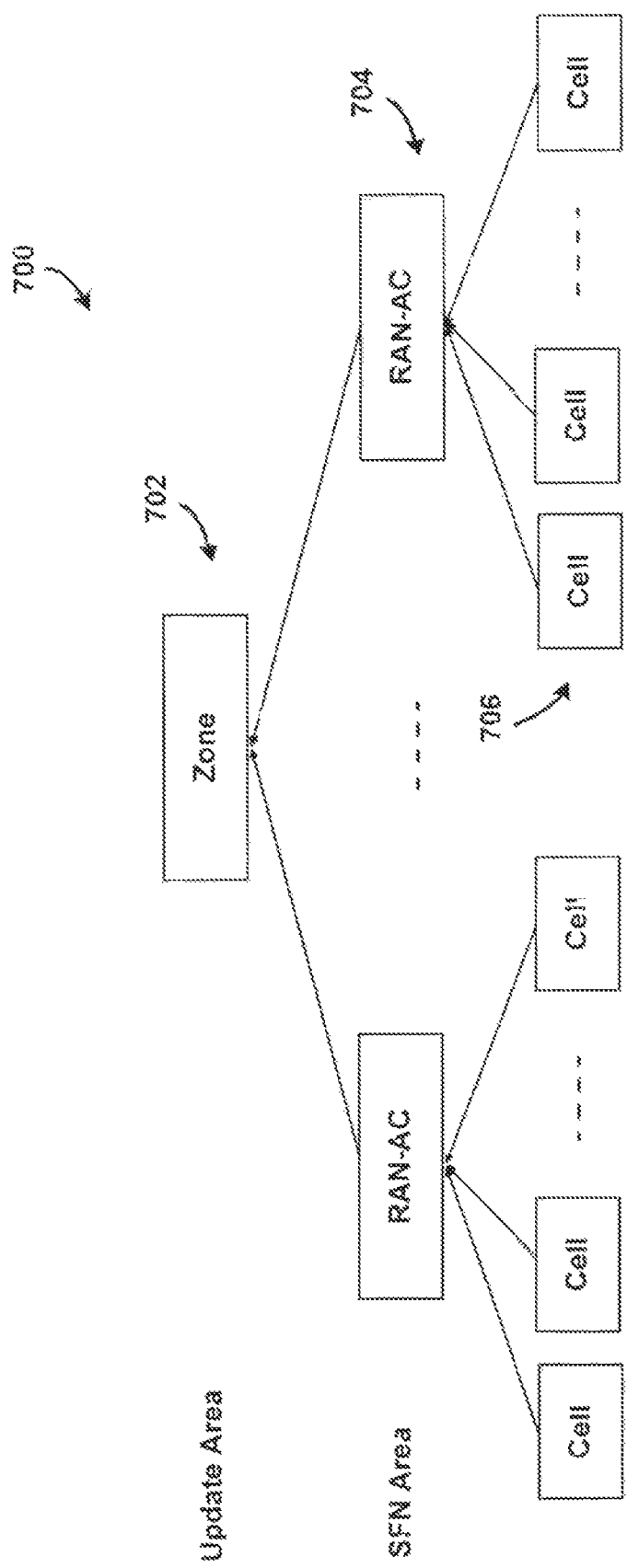
FIG. 7 is a block diagram illustrating a hierarchical structure implemented by network nodes according to some embodiments of the present disclosure.

FIG. 7 illustrates a hierarchical structure 700 implemented by the system described above. At a top level of the hierarchy, a tracking area update zone 702 is composed of multiple SFNs 704 having RAN-ACs, and the SFNs are composed of multiple cells 706. Stated differently, individual cells 706 are grouped into SFNs 704 having RAN-ACs, and the SFNs 704 are grouped into tracking area update zones 702. A UE in the RRC idle state can monitor the tracking area, whereas in the RRC inductive state, the UE can monitor the RNA.

Figure 8:
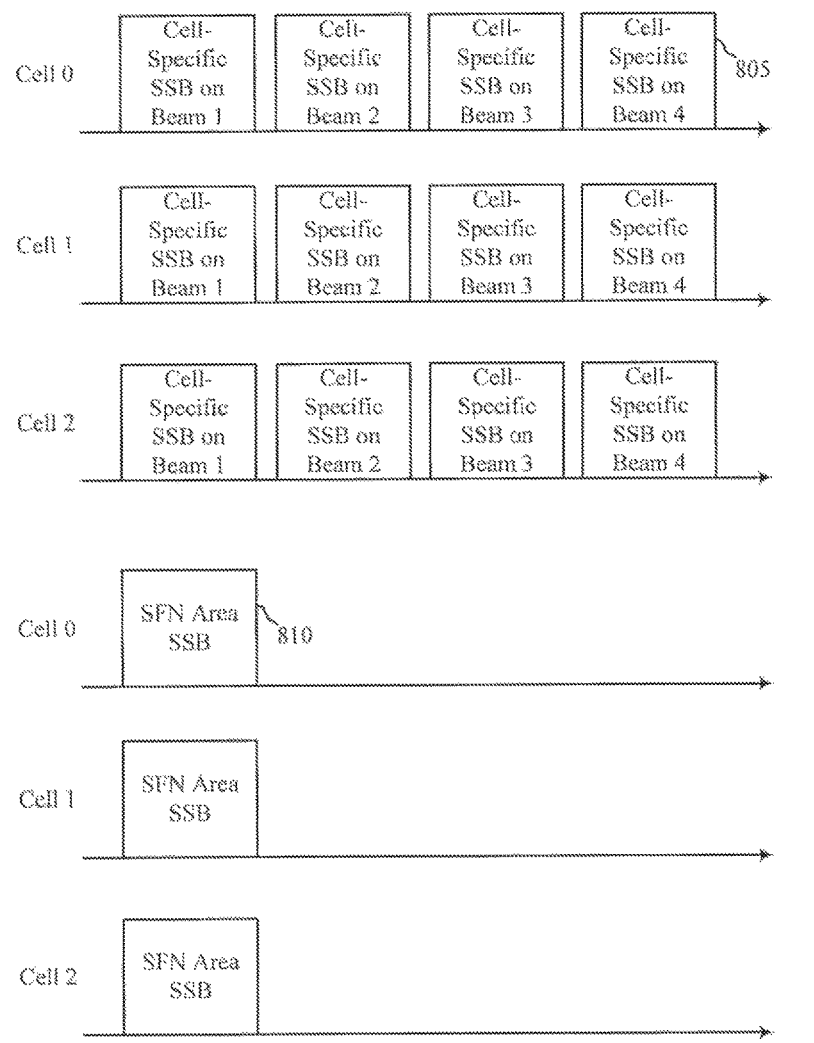
FIG. 8 is a block diagram illustrating SSB transmissions according to some embodiments of the present disclosure.

Turning to FIG. 8, the benefits of hierarchical mobility are illustrated. UE behavior is simplified to monitor RAN-AC SS and paging in a wider area in Idle/Inactive states, and paging overhead in lime is reduced due to simultaneous SFN paging at the network. FIG. 8 illustrates an example of a SSB configuration 800 that supports multi-cell SFN areas in accordance with aspects of the present disclosure. Aspects of SSB configuration 800 may be implemented by a network entity, base station, and/or UE, which may be examples of the corresponding devices described herein.

Generally, a network entity may configure a SFN for a SFN area for a UE when the UE is operating in a RRC active or inactive state of a DRX mode. In some aspects, the SFN area (e.g., RNA) may include a plurality of cells, e.g., base stations. In the example SSB configuration 800, the SFN area includes three cells (e.g., cell 0, cell 1, and cell 2), although SFN areas having more or fewer cells may also be used. Generally, the SFN for the SFN area may be used to broadcast one or more SSBs 810 over the SFN from the cells within the SFN area. For example, each of the cells within the SFN area may broadcast over the SFN one or more SSBs 810 on the same frequency channel, at the same time, and the like. In some aspects, the one or more SSBs 810 broadcast over the SFN for the SFN area may be broadcast in a omni-directional transmission and/or in a directional transmission using one or more beams. In the example SSB configuration 800, the one or more SSBs 810 are broadcast in an omni-directional transmission and at the same time.

In some aspects, the plurality of cells forming the SFN for the SFN area may also transmit cell specific SSBs 805 in a beam sweeping manner. For example, cell 0 may transmit a cell specific SSB 805 on beam one during a first time period, followed by transmitting the cell specific SSB 805 on beam two during a second time period, and so forth. Cells 1 and 2 may also transmit cell specific SSBs 805 in a beam sweeping manner where each cell specific SSB is transmitted on u particular beam during a particular time period.

In some aspects, the cell specific SSBs 805 may be transmitted at the same time or at a different time as the one or more SSBs 810 broadcast over the SFN. In the example SSB configuration 800, the one or more SSBs 810 broadcast over the SFN are transmitted at the same lime as the cell specific SSB 805 transmitted on beam one by cells 0-2. In some aspects, the cell specific SSBs 805 may be transmitted using the same periodicity and/or a different periodicity as the one or more SSBs 810 broadcast over the SFN. In some aspects, the cell specific SSBs 805 may be transmitted using the same numerology or a different numerology as the one or more SSBs 810 broadcast over the SFN. In some aspects, the cell specific SSBs 805 may be transmitted using a different identifier or the same identifier as is associated with the one or more SSBs 810 broadcast over the SFN.

In some aspects, a UE may receive the one or more SSBs 810 broadcast over the SFN and use the one or more SSBs 810 to perform a channel measurement procedure, e.g., to determine a channel performance metric and/or for timing/frequency synchronization and alignment. In some aspects, the UE may transmit a feedback report to one or more cells within the SFN area carrying or otherwise conveying an indication of a result of the channel measurement procedure. In some aspects, the UE may simply use the results of the channel measurement procedure for channel performance determination, timing synchronization, and the like.

Thus, SSB configuration 800 provides a mechanism where the UE behavior is simplified by monitoring the one or more SSBs 810 broadcast over the SFN for the SFN area for channel performance determination and/or paging. In some aspects, a paging overhead may be reduced in time using SSB configuration 800 due to the simultaneous SFN area paging.

The RAN Notification Area (RNA) can be defined as a group of multiple cells. Each cell of the RNA has a cell ID and RAN area code (RAN-AC). A group of multiple RAN areas can be achieved. A RNA can be defined over multiple tracking areas, with SIB1 carrying the Cell_Identity. A RNA can also be configured for a UE specifically, such that a first UE and a second UE may have a different definition of RNA (different RNA boundary), e.g., high mobility UE vs. low mobility UE.

The present disclosure sets forth various solutions to physical layer implementation of hierarchical mobility, as described above, for example, implementation of a network (e.g., RAN-AC) Sync Signal (SS) may provide network (e.g., RAN-AC) ID signaling, a reference signal to support network (e.g., RAN-AC) reselection/RNA update, timing re-synchronization for network (e.g., RAN-AC) SSS detection/measurement, and a reference signal to support time/frequency tracking for decoding network (e.g., RAN-AC) based paging.

Figure 9:
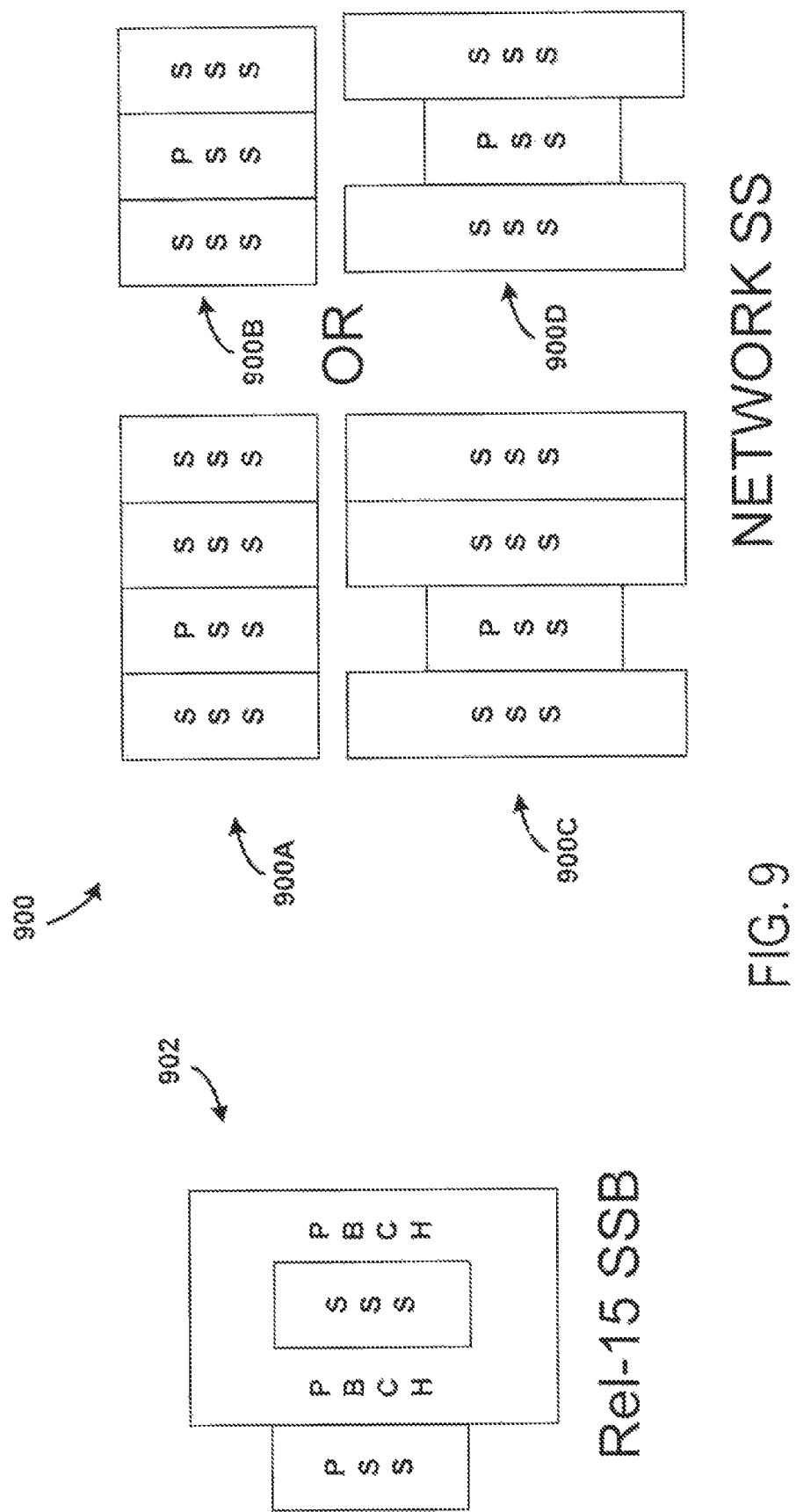
FIG. 9 is a block diagram illustrating a synchronization signal waveform according to some embodiments of the present disclosure.

Turning to FIG. 9, the present disclosure provides at least one of the solutions to physical layer implementation of hierarchical mobility by presenting novel network (e.g., RAN-AC) SS waveforms 900 that are different from the waveform 902 of the Release 15 SSB. For example, the waveform 902 of the Release 15 SSB has a PSS that precedes a wider bandwidth PHCH containing a SSS. In contrast, the network SS waveforms of the example hierarchical mobility physical layer implementations have a SSS that precedes a PSS, which is followed by at least one more SSS. Waveform 900A, for example, has a SSS followed immediately by a PSS and two more repetitions of the SSS, all of the same bandwidth and carrier frequency resource allocation. An additional example waveform 900B has a SSS followed immediately by a PSS and only one more repetition of the SSS, all of the same bandwidth and carrier frequency resource allocation. Another example waveform 900C has a SSS followed immediately by a PSS and two more repetitions of the SSS, but the SSS has a larger bandwidth than the PSS. For example, the bandwidth of the SSS can be the same as the bandwidth of the PBCH of waveform 902. A further example waveform 900D has a SSS followed immediately by a PSS and only one more repetition of the SSS, but the SSS has a larger bandwidth than the PSS. Again, the bandwidth of the SSS can be the same as the bandwidth of the PBCH of waveform 902. Accordingly, unlike the waveform 902, waveform 900 has a symbol for PSS and 2 or 3 symbols for SSS. Another difference is that waveform 900 carries a network (e.g., SFN) identity, such as a RAN-AC identity, instead of PCI. A sufficiently large number of network (e.g., RAN-AC) IDs (e.g., 1008) may be provided for flexible network planning (e.g., partitioning RAN-ACs within a given RNA). The transmission of the SSS immediately before the PSS serves to tune automatic gain control (AGC) for or the detection of PSS. If PSS is the first symbol, the UE either needs to use an old AGC state from a previous measurement or DRX cycle or fix it to a default setting. Accordingly, the waveform 900 advantageously improves tracking loop performance and radio resource management (RRM) measurement accuracy, while removing the need for waking-up over multiple SS occasions for automatic gain control (AGC) and RRM measurement.

Figure 10:
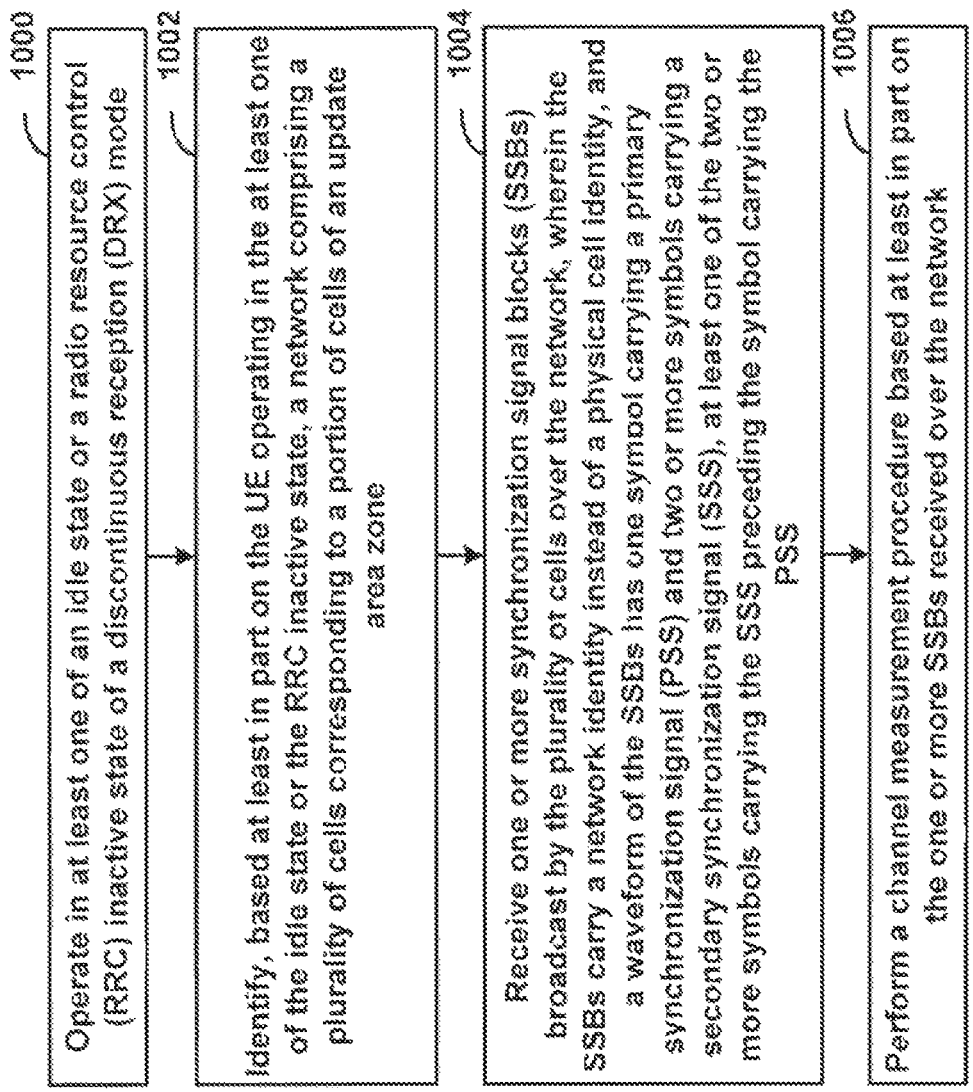
FIG. 10 is a block diagram illustrating example blocks of a wireless communication process according to some embodiments of the present disclosure.

Turning to FIG. 10, a method for wireless communication at a user equipment (UE) begins at block 1000, by operating in at least one of an idle state or a radio resource control (RRC) inactive state of a discontinuous reception (DRX) mode. Processing may proceed from block 1000 to block 1002.

At block 1002, the method proceeds by identifying, based at least in part on the UE operating in the at least one of the idle state or the RRC inactive state, a network (e.g., SFN) comprising a plurality of cells corresponding to a portion of cells of an update area zone. Processing may proceed from block 1002 to block 1004.

At block 1004, the method proceeds by receiving one or more synchronization signal blocks (SSBs) broadcast by the plurality of cells over the network. The SSBs carry a network (e.g., SFN) identity, such as a radio access network area code (RAN-AC) identity, instead of a physical cell identity. A waveform of the SSBs has one symbol carrying a primary synchronization signal (PSS) and two or more symbols carrying a secondary synchronization signal (SSS), at least one of the two or more symbols carrying the SSS preceding the symbol carrying the PSS. Processing may proceed from block 1004 to block 1006.

At block 1006, the method proceeds by performing a channel measurement procedure based at least in part on the one or more SSBs received over the network. After block 1006, processing may end. Alternatively, processing may proceed from block 1006 to an earlier point in the process, such as block 1000.

Figure 11:
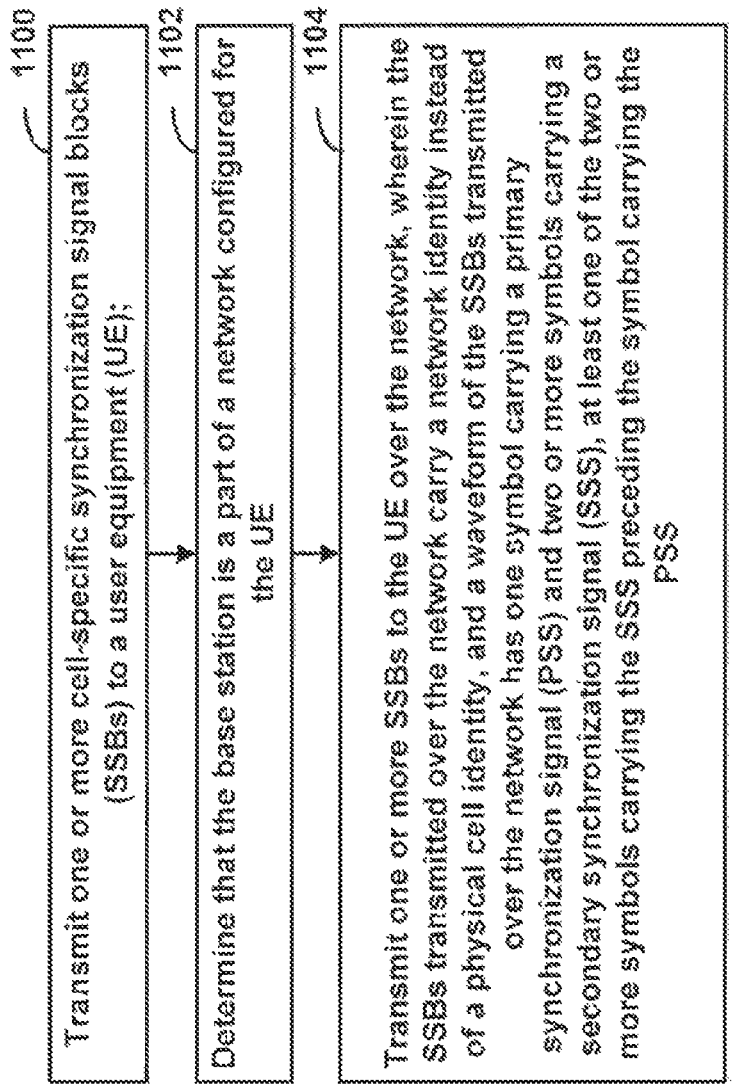
FIG. 11 is a block diagram illustrating example blocks of a wireless communication process according to some embodiments of the present disclosure.

Turning to FIG. 11, a method for wireless communication at a base station begins at block 1100 by transmitting one or more cell-specific synchronization signal blocks (SSBs) to a user equipment (UE). Processing may proceed from block 1100 to block 1102.

At block 1102, the method proceeds by determining that the base station is a part of a network (e.g., SFN) for a network (e.g., SFN) area configured for the UE. Processing may proceed from block 1102 to block 1104.

At block 1104, the method proceeds by transmitting one or more SSBs to the UE over the network for the network area. The SSBs transmitted over the network carry a network identity, such as a radio access network area code (RAN-AC) identity, instead of a physical cell identity, and a waveform of the SSBs transmitted over the network has one symbol carrying a primary synchronization signal (PSS) and two or more symbols carrying a secondary synchronization signal (SSS). At least one of the two or more symbols carrying the SSS precedes the symbol carrying the PSS. After block 1106, processing may end. Alternatively, processing may proceed from block 1104 to an earlier point in the process, such as block 1100.

The present disclosure provides at least one other of the solutions to physical layer implementation of hierarchical mobility by presenting quasi colocation (QCL) of network (e.g., RAN-AC) SS with network (e.g., RAN-AC) paging PDCCH/PDSCH. The QCL means that the network SS and network paging having a same numerology, which is to say that they have the same subcarrier spacing. Accordingly, a UE may assume that the channel characteristics of the network SS and the network paging PDCCH/PDSCH, and thus infer the channel characteristics of the network paging PDCCH/PDSCH from those of the network SS, and/or vice versa. For this solution, QCL between network SS and cell-specific SS is not necessary, but it is not incompatible either. If multiple signals are included in network SS, they are transmitted over the same antenna poll.

Figure 12:
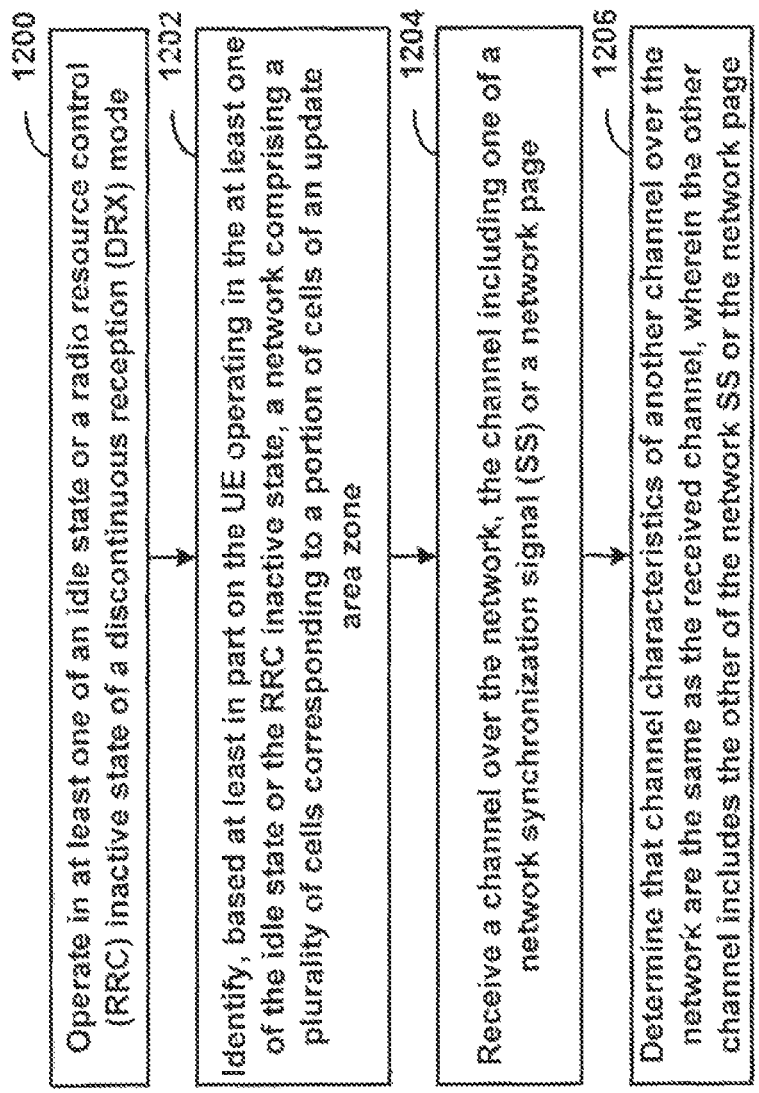
FIG. 12 is a block diagram illustrating example blocks of a wireless communication process according to some embodiments of the present disclosure.

Turning to FIG. 12, a method for wireless communication at a user equipment (UE) begins at block 1200, by operating in at least one of an idle state or a radio resource control (RRC) inactive state of a discontinuous reception (DRX) mode. Processing may proceed from block 1200 to block 1202.

At block 1202, the method proceeds by identifying, based at least in part on the UE operating in the at least one of the idle state or the RRC inactive state, a network (e.g., SFN) comprising a plurality of cells corresponding to a portion of cells of an update area zone. Processing may proceed from block 1202 to block 1204.

At block 1204, the method proceeds by receiving a channel over the network, the channel including one of a network (e.g., radio access network area code (RAN-AC)) synchronization signal (SS) or a network (e.g., RAN-AC) page. Processing may proceed from block 1204 to block 1206.

At block 1206, the method proceeds by determining that channel characteristics of another channel over the network am the same as the received channel, wherein the other channel includes the other of the network SS or the network page. After block 1206, processing may end. Alternatively, processing may proceed from block 1206 to an earlier point in the process, such as block 1200.

Figure 13:
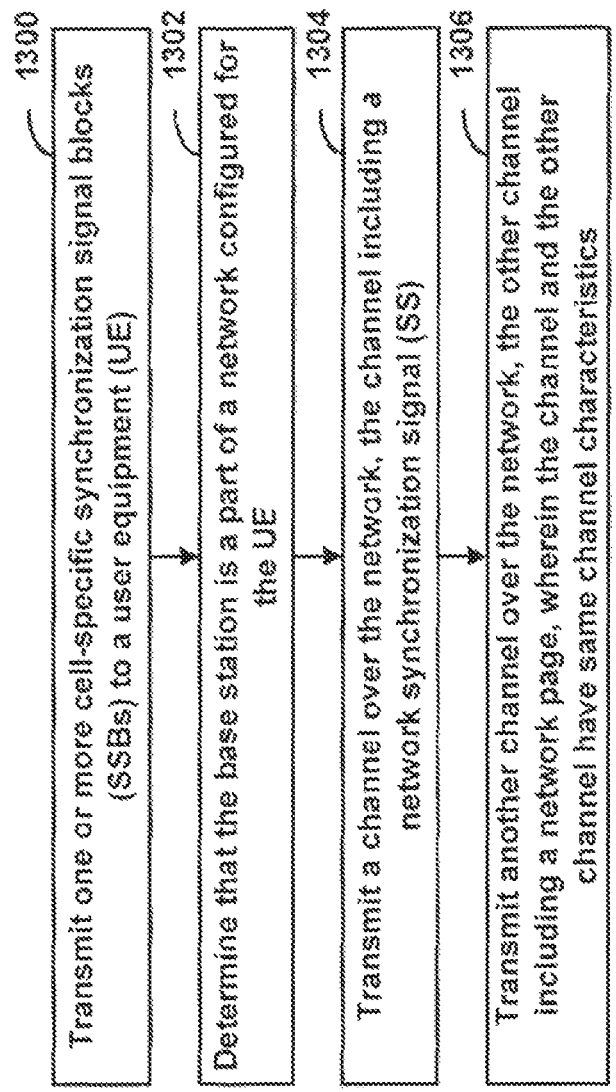
FIG. 13 is a block diagram illustrating example blocks of a wireless communication process according to some embodiments of the present disclosure.

Turning to FIG. 13, a method for wireless communication at a base station begins at block 1300, by transmitting one or more cell-specific synchronization signal blocks (SSBs) to a user equipment (UE). Processing may proceed from block 1300 to block 1302.

At block 1302, the method proceeds by determining that the base station is a part of a network (e.g., SFN) for a network (e.g., SFN) area configured for the UE Processing may proceed from block 1302 to block 1304.

At block 1304, the method proceeds by transmitting a channel over the network, the channel including a network (e.g., radio access network area code (RAN-AC)) synchronization signal (SS). Processing may proceed from block 1304 to block 1306.

At block 1306, the method proceeds by transmitting another channel over the network, the other channel including a network (e.g., RAN-AC) page, wherein the channel and the other channel have same channel characteristics. Alter block 1306, processing may end. Alternatively, processing may proceed from block 1306 to an earlier point in the process, such as block 1300.

The present disclosure provides at least one other of the solutions to physical layer implementation of hierarchical mobility by presenting a procedure for UEs to rate match around the network (e.g., RAN-AC) SS. This solution is a responsibility of the base station because legacy UEs, such as Release 15 UEs, need to be able to rate match around a network SS. For connected UEs, including legacy UEs, the UE can be informed of the network SS resources. For Release 15 initial access UEs, the base station can avoid overlapping the network SS with resources of any channels employed for initial access of cells of the update area, including a physical random access channel (PRACH), primary synchronization signal (PSS), secondary synchronization signal (SSS), physical broadcast channel (PBCH), physical downlink control channel (PDCCH) and physical downlink shared channel (PDSCH) for system information transmission, and PDCCH and PDSCH until radio resource control (RRC) connection establishment. In this case, the network SS resources receive no special treatment. Stated differently, Release 15 UEs may assume that no SFN SS resources exist in the configured resources. Accordingly, up to 40 resource blocks may be used for a network SS having a periodicity of 40 ms or longer. The base station may also use one of the potential locations of cell-specific SSBs if the locations are available.

Figure 14:
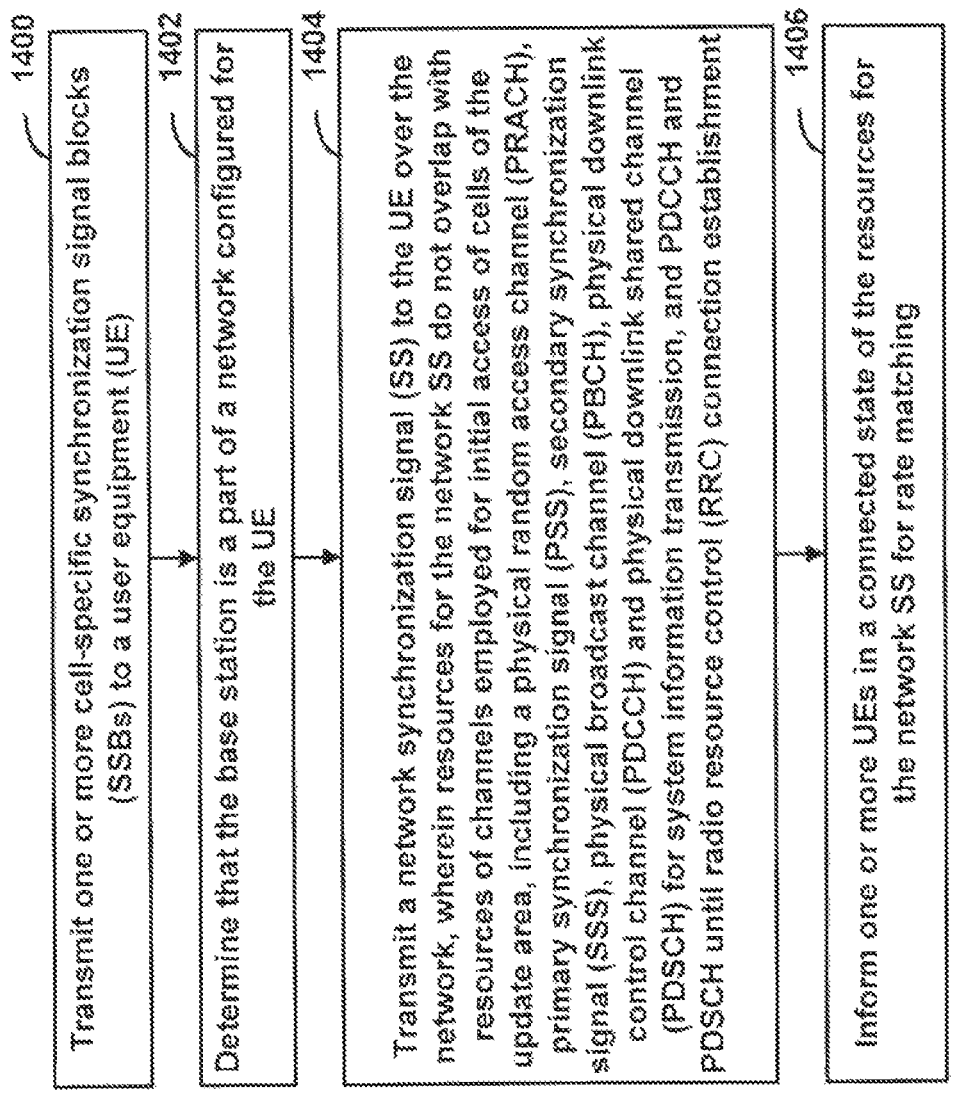
FIG. 14 is a block diagram illustrating example blocks of a wireless communication process according to some embodiments of the present disclosure.

Turning now to FIG. 14, a method for wireless communication at a base station begins at block 1400, by transmitting one or more cell-specific synchronization signal blocks (SSBs) to a user equipment (UE). Processing may proceed from block 1400 to block 1402.

At block 1402, the method proceeds by determining that the base station is a part of a network (e.g., SFN) for a network (e.g., SFN) area configured for the UE. Processing may proceed from block 1402 to block 1404.

At block 1404, the method proceeds by transmitting a network (e.g., radio access network area code (RAN-AC)) synchronization signal (SS) to the UE over the network, wherein resources for the network SS do not overlap with resources of channels employed for initial access of cells of the update area, including a physical random access channel (PRACH), primary synchronization signal (PSS), secondary synchronization signal (SSS), physical broadcast channel (PBCH), physical downlink control channel (PDCCH) and physical downlink shared channel (PDSCH) for system information transmission, and PDCCH and PDSCH until radio resource control (RRC) connection establishment. Stated differently, the base station selects the resources for the network SS to ensure no overlap of those resources with any resources of the base station that legacy UEs need to use to initially access the base station. For example, the resources for the network SS may correspond to one or more potential locations for the cell-specific SSBs. Processing may proceed from block 1404 to block 1406.

At block 1406, the method proceeds by informing one or more UEs in a connected state of the resources for the network SS for rate matching. After block 1406, processing may end. Alternatively, processing may proceed from block 1406 to an earlier point in the process, such as block 1400.

The present disclosure provides at least one other of the solutions to physical layer implementation of hierarchical mobility by presenting a methodology for wireless transmission and receipt of network (e.g., RAN-AC) paging PDCCH and PDSCH. According to this solution, the network paging PDCCH and PDSCH have the same numerology, which can follow cell-specific paging PDCCH/PDSCH, and the network (e.g., RAN-AC) SS may follow cell-specific SS instead of network paging PDCCH/PDSCH. In this case, the RRC release provides a CORESET/Search space for network paging PDCCH, where the network paging PDCCH/PDSCH is network (e.g., RAN-AC) specific. Additionally, the DMKS and/or scrambling sequence of PDCCH/PDSCH depends at least in part on the network identity (e.g., RAN-AC ID).

Figure 15A:
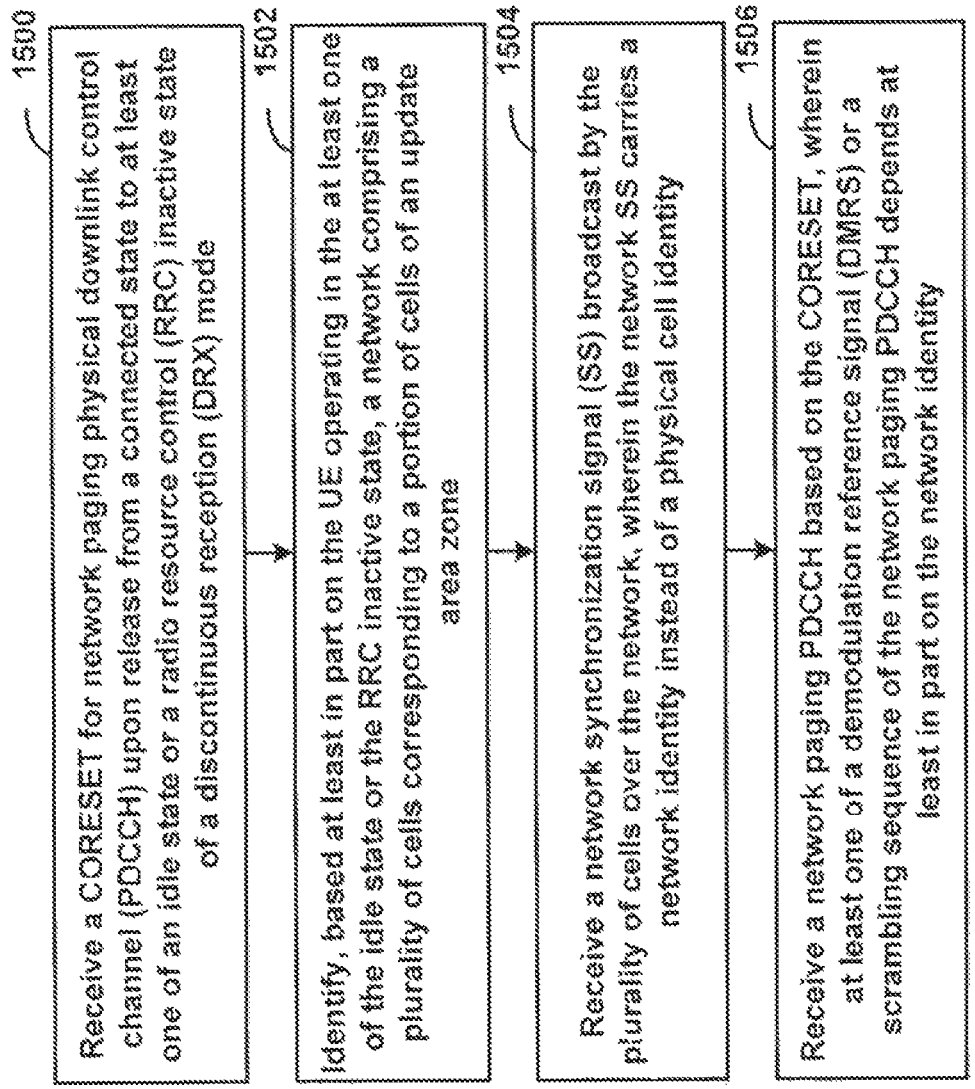
FIG. 15A is a block diagram illustrating example blocks of a wireless communication process according to some embodiments of the present disclosure.

Turning now to FIG. 15A, a method for wireless communication at a user equipment (UE) begins at block 1500, by receiving a control resource set (CORESET) for network (e.g., radio access network (RAN) area code (AC)) paging physical downlink control channel (PDCCH) upon release from a connected sale to at least one of an idle state or a radio resource control (RRC) inactive state of a discontinuous reception (DRX) mode. Processing may proceed from block 1500 to block 1502.

At block 1502, the method proceeds by identifying, based at least in part on the UE operating in the at least one of the idle state or the RRC inactive state, a network (e.g., SFN) comprising a plurality of cells corresponding to a portion of cells of an update area zone. Processing may proceed from block 1502 to block 1504.

At block 1504, the method proceeds by receiving a network (e.g., radio access network area code (RAN-AC)) synchronization signal (SS) broadcast by the plurality of cells over the network, wherein the network SS carries a network identity, such as a SFN (e.g., radio access network area code (RAN-AC) identity, instead of a physical cell identity. Processing may proceed from block 1504 to block 1506.

At block 1506, the method proceeds by receiving a network (e.g., RAN-AC) paging PDCCH based on the CORESET, wherein at least one of a demodulation reference signal (DMRS) or a scrambling sequence of the network paging PDCCH depends at least in part on the network identity. After block 1506, processing may end. Alternatively, processing may proceed from block 1506 to an earlier point in the process, such as block 1500.

Figure 15B:
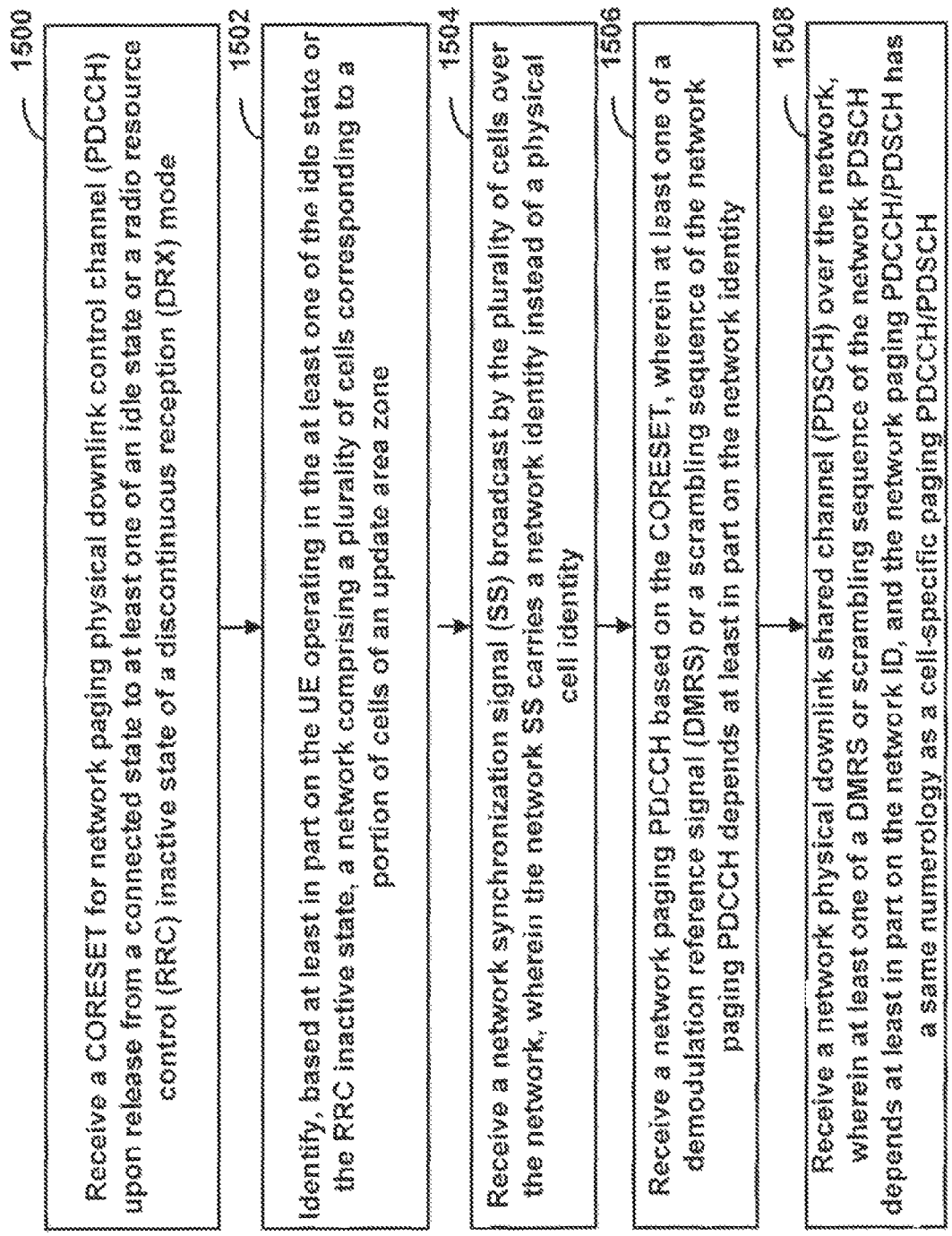
FIG. 15B is a block diagram illustrating example blocks of a wireless communication process according to some embodiments of the present disclosure.

Turning now to FIG. 15B, another method for wireless communication at a user equipment (UE) includes blocks 1500-1506 as described above with reference to FIG. 15A. However, in FIG. 15B, processing may proceed from block 1506 to block 1508.

At block 1508, the method proceeds by receiving a network (e.g., RAN-AC) physical downlink shared channel (PDSCH) over the network. At least one of a DMRS or scrambling sequence of the network PDSCH depends at least in part on the network identity (e.g., RAN-AC ID), and the network paging PDCCH/PDSCH has a same numerology as a cell-specific paging PDCCH/PDSCH. After block 1508, processing may end. Alternatively, processing may proceed from block 1508 to an earlier point in the process, such as block 1500.

Figure 16A:
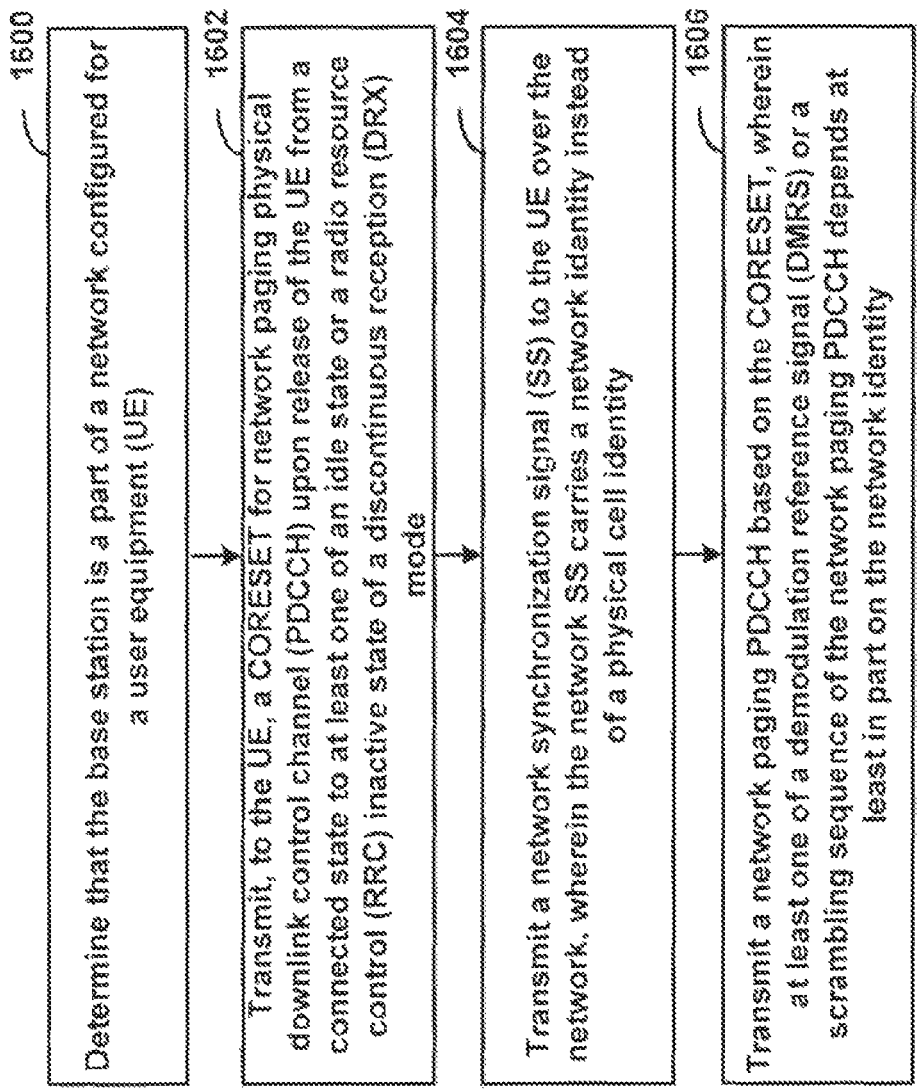
FIG. 16A is a block diagram illustrating example blocks of a wireless communication process according to some embodiments of the present disclosure.

Turning now to FIG. 16A, a method for wireless communication at a base station begins at block 1600, by determining that the base station is a part of a network (e.g., SFN) for a network (e.g., SFN) area configured or a user equipment (UE). Processing may proceed from block 1600 to block 1602.

At block 1602, the method proceeds by transmitting, to the UE a CORESET for network (e.g., radio access network (RAN) area code (AC)) paging physical downlink control channel (PDCCH) upon release of the UE from a connected state to at least one of an idle state or a radio resource control (RRC) inactive state of a discontinuous reception (DRX) mode. Processing may proceed from block 1602 to block 1604.

At block 1604, the method proceeds by transmitting a network (e.g., radio access network area code (RAN-AC)) synchronization signal (SS) to the UE over the network for the network area. The network SS carries a network identity, such as a radio access network area code (RAN-AC) identity, instead of a physical cell identity. Processing may proceed from block 1604 to block 1606.

At block 1606, the method proceeds by transmitting a network (e.g., RAN-AC) paging PDCCH based on the CORESET, wherein at least one of a demodulation reference signal (DMRS) or a scrambling sequence of the network paging PDCCH depends at least in part on the network identity. After block 1606, processing may end. Alternatively, processing may proceed from block 1606 to an earlier point in the process, such as block 1600.

Figure 16B:
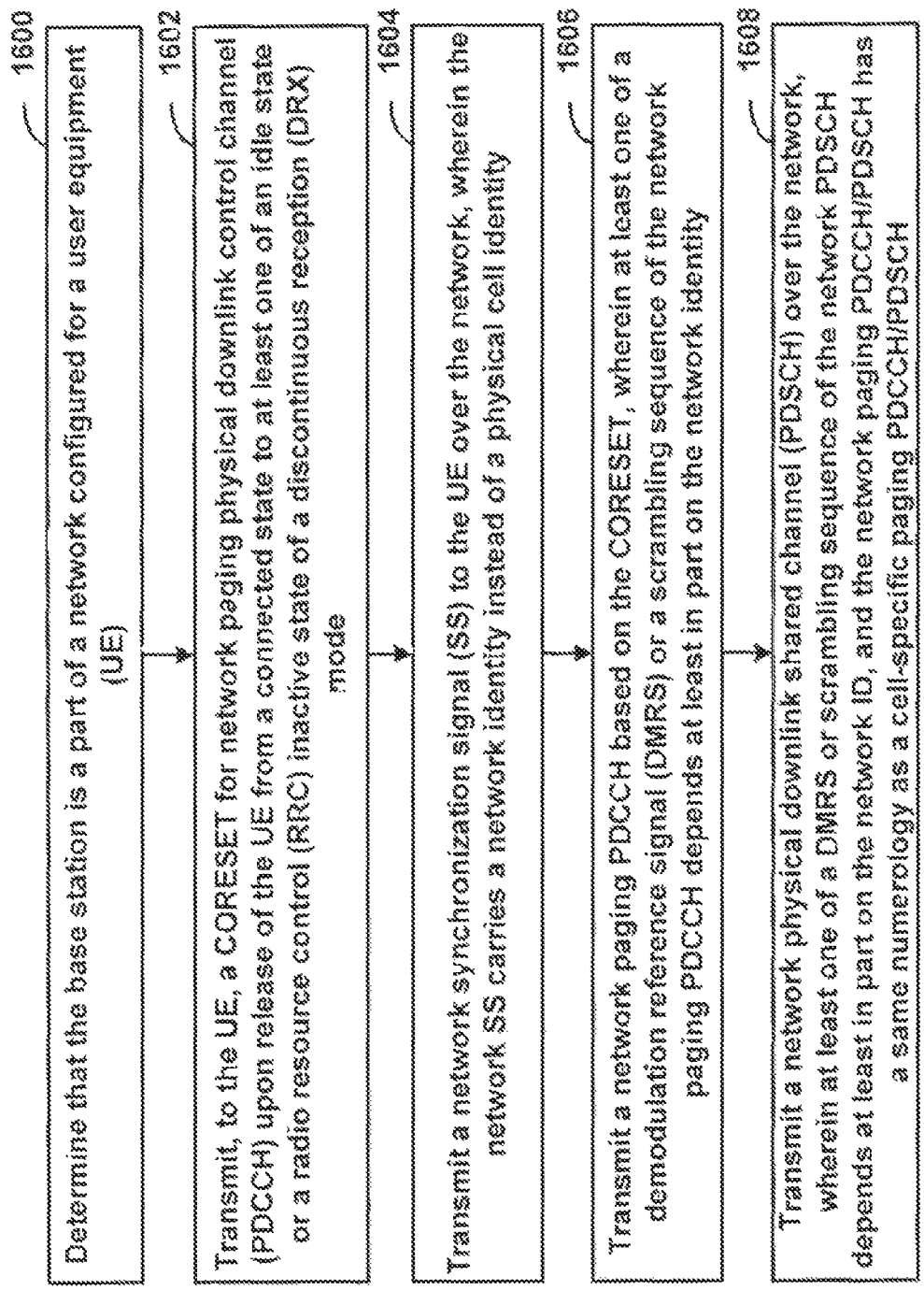
FIG. 16B is a block diagram illustrating example blocks of a wireless communication process according to some embodiments of the present disclosure.

Turning now to FIG. 16B, another method for wireless communication at a base station includes blocks 1600-1606 as described above with reference to FIG. 16A. However, in FIG. 16B, processing may proceed from block 1606 to block 1608.

At block 1608, the method proceeds by transmitting a network (e.g., RAN-AC) physical downlink shared channel (PDSCH) over the network, wherein at least one of a DMRS or scrambling sequence of the network PDSCH depends at least in part on the network identity (e.g., RAN-AC ID), and the network paging PDCCH/PDSCH has a same numerology as a cell-specific paging PDCCH/PDSCH. Alternatively or additionally, the network SS may have a same numerology as a cell-specific SS. After block 1608, processing may end. Alternatively, processing may proceed from block 1608 to an earlier point in the process, such as block 1600.

The present disclosure provides at least one other of the solutions to physical layer implementation of hierarchical mobility by presenting a network (e.g., SFN) wake up signal (WUS) for network (e.g., SFN) paging and/or cell-specific paging. For example if there is no grant for network paging, the base station nay transmit network SSB without a network WUS, and when there is a grant for network paging, the base station may transmit the network SSB, followed by the network WUS and the network page. In turn, the UE may receive the network SSB and monitor for the network WUS. For a network page, when the UE receives the network WUS, then the UE may respond by receiving the network page and switching to cell-level mobility. Compared to the ease of hierarchical mobility only, additional saving is achieved between network WUS monitoring and network paging monitoring. For a cell-specific page, the UE may respond to the network WUS by switching to cell-level mobility, identifying a serving cell, and receiving the cell-specific page by monitoring a paging search space for the identified serving cell. Accordingly, the base station may implement a minimum gap between the network WUS and the cell-specific page that is sufficient to allow the UE enough time to switch to cell-level mobility, identify a serving cell, and begin monitoring a paging search space for the identified serving cell. This minimum gap may be defined on the order of slots since the UE needs to identify a serving cell before monitoring the search space for cell-specific paging. The minimum gap may be defined in a wireless communications standard. The minimum gap may be indicated as pan of the network WUS.

Figure 17A:
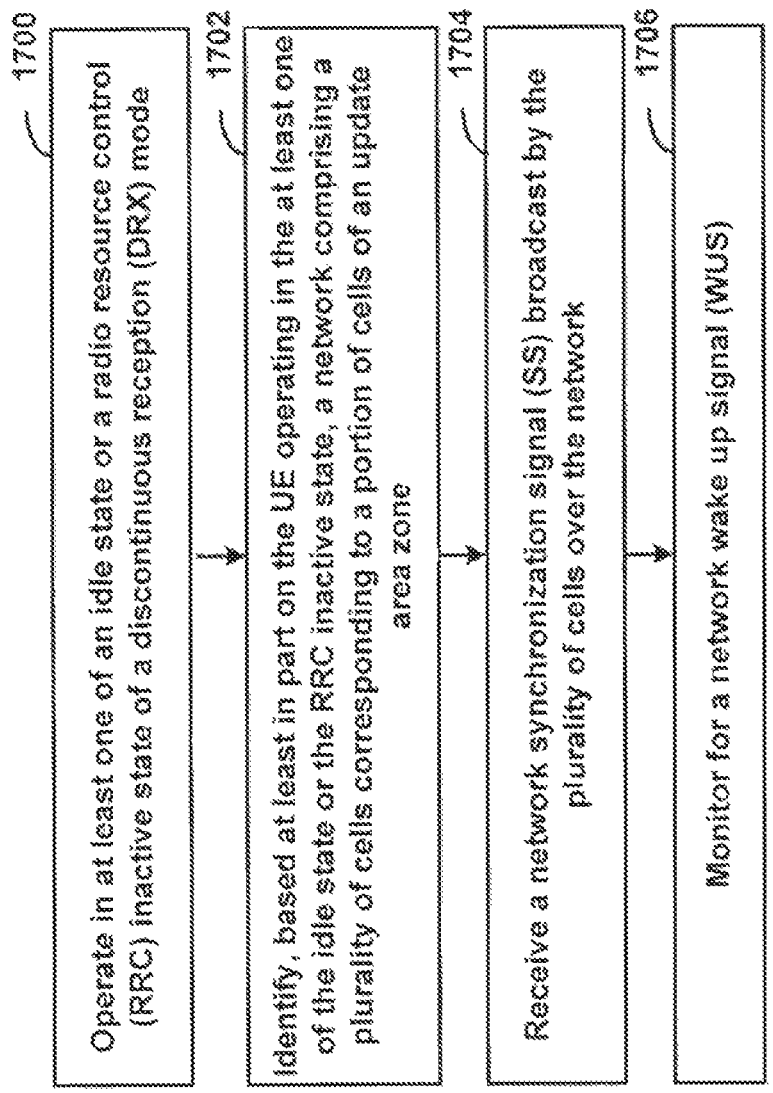
FIG. 17A is a block diagram illustrating example blocks of a wireless communication process according to some embodiments of the present disclosure.

Turning now to FIG. 17A, a method for wireless communication at a user equipment (UE) begins at block 1700, by operating in at least one of an idle state or a radio resource control (RRC) inactive state of a discontinuous reception (DRX) mode. Processing may proceed from block 1700 to block 1702.

At block 1702, the method proceeds by identifying, based at least in part on the UE operating in the at least one of the idle state or the RRC inactive state, a network (e.g., SFN) comprising a plurality of cells corresponding to a portion of cells of an update area zone. Processing may proceed from block 1702 to block 1704.

At block 1704, the method proceeds by receiving a network (e.g., radio access network area code (RAN-AC)) synchronization signal (SS) broadcast by the plurality of cells over the network. Processing may proceed from block 1704 to block 1706.

At block 1706, the method proceeds by monitoring for a network wake up signal (WUS) every DRX cycle in place of paging monitoring. After block 1706, processing may end. Alternatively, processing may proceed from block 1706 to an earlier point in the process, such as block 1700.

Figure 17B:
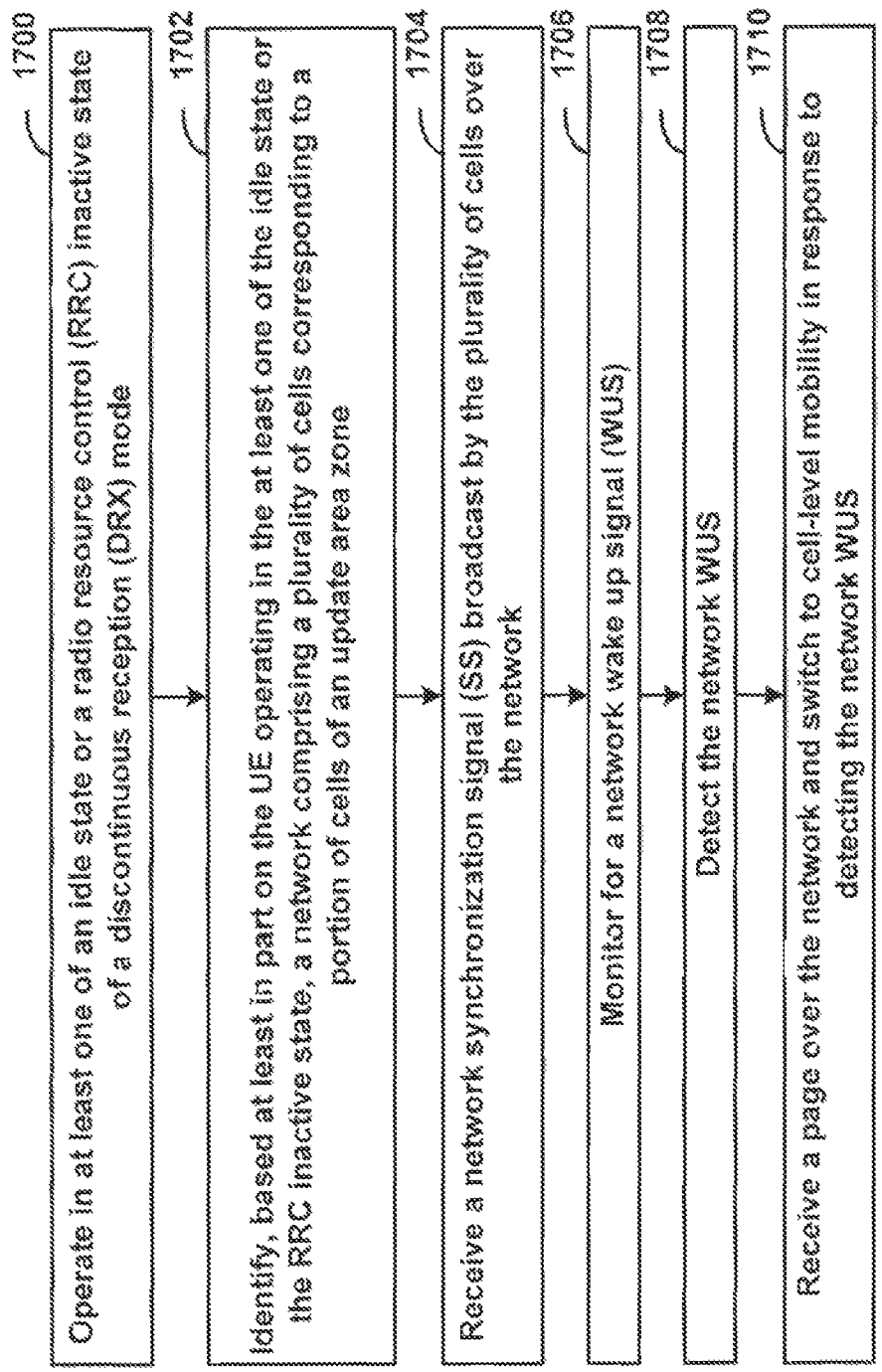
FIG. 17B is a block diagram illustrating example blocks of a wireless communication process according to some embodiments of the present disclosure.

Turning now to FIG. 17B, another method for wireless communication at a user equipment (UE) includes blocks 1700-1706 as described above with reference to FIG. 17A. However, in FIG. 17B, processing may proceed from block 1706 to block 1708.

At block 1708, the method proceeds by detecting the network WUS. Processing may proceed from block 1708 to block 1710.

At block 1710, the method proceeds by receiving a page over the network and switching to cell-level mobility, both in response to detecting the network WUS. In the case of a network page (e.g., RAN-AC page), the UE receives the network page over the network. For a cell-specific page, the UE responds to the network WUS by switching to cell-level mobility, identifying a serving cell, and receiving the cell specific page by monitoring a paging search space for the identified serving cell. After block 1708, processing may end. Alternatively, processing may proceed from block 1708 to an earlier point in the process, such as block 1700.

Figure 18:
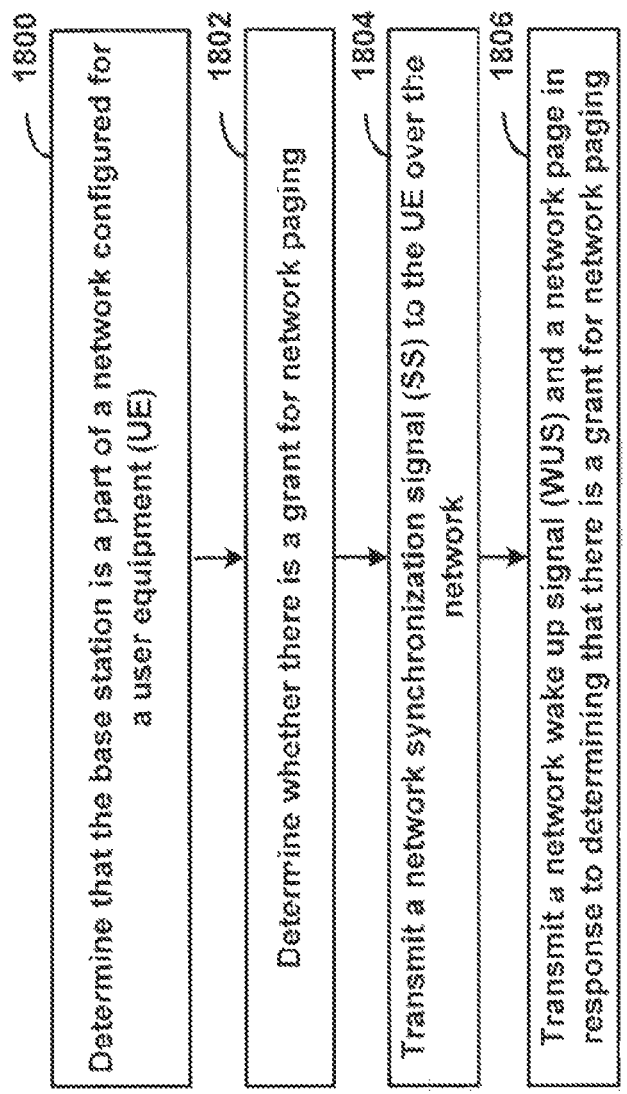
FIG. 18 is a block diagram illustrating example blocks of a wireless communication process according to some embodiments of the present disclosure.

Turning now to FIG. 18, a method for wireless communication at a base station begins at block 1800, by determining that the base station is a part of a network (e.g., SFN) for a network (e.g., SFN) area configured for a user equipment (UE). Processing may proceed from block 1800 to block 1802.

At block 1802, the method proceeds by determining whether there is a grant for network page (e.g., RAN-AC page) or a cell-specific page. Processing may proceed from block 1802 to block 1804.

At block 1804, the method proceeds by transmitting a network (e.g., RAN-AC) synchronization signal (SS) to the UE over the network for the network area. Processing may proceed from block 1804 to block 1806.

At block 1806, the method proceeds by transmitting a network wake up signal (WUS) and a page in response to determining that there is a grant for paging. For a network page (e.g., RAN-AC page), the base station transmits the page over the network. For a cell-specific page, the base station transmits the network WUS with a minimum gap between the network WUS and the cell-specific page, and this minimum gap should be sufficient to allow the UE enough time to switch to cell-level mobility, identify a serving cell, and begin monitoring a paging search space for the identified serving cell. After block 1806, processing may end. Alternatively, processing may proceed from block 1806 to an earlier point in the process, such as block 1800.

Turning now to FIG. 19, a UE 1900, such as a UE 115 (see FIG. 2), may have a controller/processor 280, a memory 282, and antennas 252a through 252r, as described above. UE 1900 may also have wireless radios 1901a to 1901r that comprise additional components also described above with reference to FIG. 2. The memory 282 of UE 1900 stores one or more algorithms that configure processor/controller 280 to carry out one or more procedures as described above with reference to FIGS. 3, 10, 12, 15A, 15B, 17A, and 17B.

One or more algorithms stored by memory 282 configure processor/controller 280 to carry out one or more procedures relating to wireless communication by the UE 1900, as previously described. For example, SSB receiver 1902 configures controller processor 280 to carry out operations that include receiving and processing a SFN (e.g., RAN-AC) SS in any manner previously described, such as with reference to FIG. 10. Additionally, QCL receiver 1903 configures controller processor 280 to carry out operations that include determining channel characteristics of SFN (e.g., RAN-AC) paging PDCCH/PDSCH from those of the SFN SS, and/or vice versa, in any manner previously described, such as with reference to FIG. 12. Also, PDCCH/PDSCH receiver 1904 configures controller/processor 280 to carry out operations that include receiving and utilizing a SFN (e.g., RAN-AC) specific CORESET/Search space for SFN (e.g., RAN-AC) paging PDCCH in any manner previously described, such as with reference to FIGS. 15A and 15B. Further, WUS receiver 1905 configures controller/processor 280 to carry out operations that include monitoring for a WUS in any manner previously described, such as with reference to FIGS. 17A and 17B.

Referring now to FIG. 20, a base station 2000, such as a NR-SS base station 105 (see FIG. 2), may have a controller/processor 240, a memory 242, and antennas 234a through 234t, as described above. The base station 2000 may also have wireless radios 2001a to 2001t that comprise additional components also described above with reference to FIG. 2. The memory 242 of base station 2000 stores one or more algorithms that configure processor/controller 240 to carry out one or more procedures as described above with reference to FIGS. 3, 11, 13, 14, 16A, 16B, and/or 18.

One or more algorithms stored by memory 242 configure processor/controller 240 to carry out one or more operations relating to wireless communication by the base station 2000, as previously described. For example, SSB transmitter 2002 configures controller processor 240 to carry out operations that include transmitting a SFN (e.g., RAN-AC) SS in any manner previously described, such as with reference to FIG. 11. Additionally, QCL transmitter 2003 configures controller processor 240 to carry out operations that include transmitting QCL SFN (e.g., RAN-AC) SS and SFN (e.g., RAN-AC) paging channels in any manner previously described, such as with reference to FIG. 13. Also, network SS resource transmitter 2004 configures controller processor 240 to carry out operations that include transmitting a network (e.g., RAN-AC) SS in non-overlapping resources and informing connected state UEs of network SS resources in any manner previously described, such as with reference to FIG. 14. Further, PDCCH/PDSCH transmitter 2005 configures controller processor 240 to carry out operations that include transmitting a CORESET for network (e.g., RAN-AC) PDCCH and transmitting network (e.g., RAN-AC) PDCCH based on the CORESET in any manner previously described, such as with reference to FIGS. 16A and 16B. Further, WUS transmitter 2006 configures controller processor 240 to carry out operations that include transmitting a network WUS for paging in any manner previously described, such as with reference to FIG. 18.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The functional blocks and modules described herein (e.g., the functional blocks and modules in FIGS. 2, 3, 10-14, 15A, 15B, 16A, 16B, 17A, 17B, and 18-20) may comprise processors, electronics devices, hardware devices, electronics components, logical circuits, memories, software codes, firmware codes, etc., or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data strictures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), hard disk, solid state disk, and blu-ray disc where disks usually reproduce data magnetically, while discs reproduce data optically with lasers. Combinations of the above should also be included within the scope of computer-readable media.

As used herein, including in the claims, the term "and/or" when used in a list of two or more items, means that any one of the listed items can be employed by itself, or any combination of two or more of the listed items can be employed. For example, it a composition is described as containing components A, B, and/or C, the composition can contain A alone; B alone: C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C) or any of these in any combination thereof.

The previous description of the disclosure is provided to enable any person skilled in the an to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method for wireless communication at a user equipment (UE), the method comprising:
    operating in at least one of an idle state or a radio resource control (RRC) inactive state of a discontinuous reception (DRX) mode;
    identifying, based at least in part on the UE operating in the at least one of the idle state or the RRC inactive state, a single frequency network (SFN) comprising a plurality of cells corresponding to a portion of cells of an update area zone in a radio access network area code (RAN-AC);
    receiving, over the SFN, one or more synchronization signal blocks (SSBs) broadcast by at least a first cell of the plurality of cells, wherein a waveform of the one or more SSBs has one symbol carrying a primary synchronization signal (PSS) and two or more symbols carrying a secondary synchronization signal (SSS), at least one of the two or more symbols carrying the SSS preceding the symbol carrying the PSS,
    receiving a network synchronization signal (SS) associated with the RAN-AC broadcast by the plurality of cells over the SFN; and
    monitoring for a network wake up signal (WUS) associated with the RAN-AC broadcast by the plurality of cells over the SFN.

2. The method of claim 1, further comprising:
    detecting the network WUS; and
    receiving a page over the SFN and switching to cell-level mobility in response to detecting the network WUS.

3. The method of claim 1, further comprising:
    detecting the network WUS; and
    in response to detecting the network WUS:
        switching to cell-level mobility;
        identifying a serving cell; and
        receiving a cell-specific page by monitoring a paging search space for the identified serving cell.

4. The method of claim 3, wherein a minimum gap between the network WUS and the cell-specific page is indicated by the network WUS.

5. The method of claim 1, wherein the monitoring for the network WUS comprises monitoring for the network WUS every DRX cycle in place of paging monitoring.

6. The method of claim 1, further comprising:
    performing a channel measurement procedure based at least in part on the one or more SSBs received over the SFN.

7. The method of claim 6, wherein:
    the one or more SSBs carry a network identity; and
    the update area zone comprises the RAN-AC, and wherein the network identity is a RAN-AC identity.

8. The method of claim 6, wherein the receiving the network SS broadcast comprises:
    receiving a channel over the SFN, the channel including the network SS; and
    determining that channel characteristics of another channel over the SFN are the same as the received channel, wherein the other channel includes a network page.

9. The method of claim 8, wherein the channel and the another channel have a same subcarrier spacing.

10. The method of claim 1, wherein receiving the network SS broadcast comprises receiving a channel over the SFN, the channel including the network SS.

11. An apparatus configured for wireless communication at a user equipment (UE), the apparatus comprising:
    at least one processor; and
    a memory coupled to the at least one processor, the memory storing instructions executable by the at least one processor to cause the UE to:
        operate in at least one of an idle state or a radio resource control (RRC) inactive state of a discontinuous reception (DRX) mode;
        identify, based at least in part on the UE operating in the at least one of the idle state or the RRC inactive state, a single frequency network (SFN) comprising a plurality of cells corresponding to a portion of cells of an update area zone in a radio access network area code (RAN-AC);
        receive, over the SFN, one or more synchronization signal blocks (SSBs) broadcast by at least a first cell of the plurality of cells, wherein a waveform of the one or more SSBs has one symbol carrying a primary synchronization signal (PSS) and two or more symbols carrying a secondary synchronization signal (SSS), at least one of the two or more symbols carrying the SSS preceding the symbol carrying the PSS;
        receive a network synchronization signal (SS) associated with the RAN-AC broadcast by the plurality of cells over the SFN; and
        monitor for a network wake up signal (WUS) associated with the RAN-AC broadcast by the plurality of cells over the SFN.

12. The apparatus of claim 11, wherein the instructions are further executable by the at least one processor to cause the UE to:
    detect the network WUS; and
    receive a page over the SFN and switching to cell-level mobility in response to detecting the network WUS.

13. The apparatus of claim 11, wherein the instructions are further executable by the at least one processor to cause the UE to:
    detect the network WUS; and
    in response to detecting the network WUS:
        switch to cell-level mobility;
        identify a serving cell; and
        receive a cell-specific page by monitoring a paging search space for the identified serving cell.

14. The apparatus of claim 11, wherein the instructions are further executable by the at least one processor to cause the UE to:
    perform a channel measurement procedure based at least in part on the one or more SSBs received over the SFN; and
    wherein the one or more SSBs carry a network identity instead of a physical cell identity.

15. The apparatus of claim 14, wherein the instructions are further executable by the at least one processor to cause the UE to:

receive a channel over the SFN, the channel including the network SS; and
determine that channel characteristics of another channel over the SFN are the same as the received channel, wherein the other channel includes a network page.

16. A method for wireless communication at a base station, the method comprising:
determining that the base station is a part of a single frequency network (SFN) comprising a plurality of cells corresponding to a portion of cells of an update area zone in a radio access network area code (RAN-AC) configured for a user equipment (UE);
determining whether there is a grant for paging;
transmitting, to the UE over the SFN, one or more synchronization signal blocks (SSBs), a waveform of the SSBs of the network SS transmitted over the SFN has one symbol carrying a primary synchronization signal (PSS) and two or more symbols carrying a secondary synchronization signal (SSS), at least one of the two or more symbols carrying the SSS preceding the symbol carrying the PSS;
transmitting a network synchronization signal (SS) associated with the RAN-AC to the UE over the SFN; and
transmitting a network wake up signal (WUS) associated with the RAN-AC over the SFN and a page in response to determining that there is a grant for paging.

17. The method of claim 16, wherein the page is a network page and is transmitted over the SFN.

18. The method of claim 16, wherein the page is a cell-specific page, and transmitting the network WUS and the page includes implementing a minimum gap between the network WUS and the page sufficient to allow the UE enough time to switch to cell-level mobility, identify a serving cell, and begin monitoring a paging search space for the identified serving cell.

19. The method of claim 18, wherein the network SS transmitted to the UE over the SFN includes the one or more SSBs that carry a network identity.

20. The method of claim 19, wherein the update area zone comprises the RAN-AC, and wherein the network identity is a RAN-AC identity.

21. The method of claim 19, wherein the waveform of the SSBs of the network SS has a SSS followed immediately by a PSS and the PSS is followed immediately by one or more repetition of the SSS.

22. The method of claim 19, wherein the transmitting the network SS to the UE over the SFN comprises:
transmitting a channel over the SFN, the channel including the network SS; and
transmitting another channel over the SFN, the other channel including a network page, wherein the channel and the another channel have same channel characteristics.

23. The method of claim 22, wherein the channel and the another channel have a same subcarrier spacing.

24. An apparatus configured for wireless communication at a base station, the apparatus comprising:
at least one processor; and
a memory coupled to the at least one processor, the memory storing instructions executable by the at least one processor to cause the base station to:
determine that the base station is a part of a single frequency network (SFN) comprising a plurality of cells corresponding to a portion of cells of an update area zone in a radio access network area code (RAN-AC) configured for a user equipment (UE);
determine whether there is a grant for paging;
transmit, to the UE over the SFN, to the UE over the SFN, one or more synchronization signal blocks (SSBs), a waveform of the SSBs of the network SS transmitted over the SFN has one symbol carrying a primary synchronization signal (PSS) and two or more symbols carrying a secondary synchronization signal (SSS), at least one of the two or more symbols carrying the SSS preceding the symbol carrying the PSS;
transmit a network synchronization signal (SS) associated with the RAN-AC to the UE over the SFN; and
transmit a network wake up signal (WUS) associated with the RAN-AC over the SFN and a page in response to determining that there is a grant for paging.

25. The apparatus of claim 24, wherein the page is a network page and is transmitted over the SFN.

26. The apparatus of claim 24, wherein the page is a cell-specific page, and transmitting the network WUS and the page includes implementing a minimum gap between the network WUS and the page sufficient to allow the UE enough time to switch to cell-level mobility, identify a serving cell, and begin monitoring a paging search space for the identified serving cell.

27. The apparatus of claim 26, wherein the network SS transmitted to the UE over the SFN includes the one or more SSBs that carry a network identity.

28. The apparatus of claim 27, wherein the instructions are further executable by the at least one processor to cause the base station to:
transmit a channel over the SFN, the channel including the network SS; and
transmit another channel over the network, the other channel including a network page, wherein the channel and the another channel have same channel characteristics.

* * * * *